(12) United States Patent
Rensing et al.

(10) Patent No.: US 6,701,038 B2
(45) Date of Patent: Mar. 2, 2004

(54) MICRO-ELECTROMECHANICAL OPTICAL SWITCH ASSEMBLY FOR OPTICAL DATA NETWORKS

(75) Inventors: Noa M. Rensing, West Newton, MA (US); George G. Adams, West Newton, MA (US); Nicol E. McGruer, Dover, MA (US); Robert W. McClelland, Buzzards Bay, MA (US); Paul M. Zavracky, Norwood, MA (US)

(73) Assignee: The Microoptical Corporation, Westwood, MA (US)

( * ) Notice: Subject to any disclaimer, the term of this patent is extended or adjusted under 35 U.S.C. 154(b) by 89 days.

(21) Appl. No.: 10/091,980

(22) Filed: Mar. 5, 2002

(65) Prior Publication Data

US 2002/0164113 A1 Nov. 7, 2002

Related U.S. Application Data

(60) Provisional application No. 60/273,590, filed on Mar. 5, 2001.

(51) Int. Cl.[7] .............................. G02B 6/12; G02B 6/35
(52) U.S. Cl. .............................. 385/18; 385/14; 385/17
(58) Field of Search ............................. 385/16–18, 14, 385/52

(56) References Cited

U.S. PATENT DOCUMENTS

| | | | | |
|---|---|---|---|---|
| 5,257,334 | A | 10/1993 | Takahashi | 385/65 |
| 5,321,785 | A | 6/1994 | Iida et al. | 385/85 |
| 5,771,218 | A | 6/1998 | Feldman et al. | 369/112 |
| 6,031,946 | A | 2/2000 | Bergmann et al. | 385/18 |
| 6,091,967 | A | 7/2000 | Kruys et al. | 455/557 |
| 6,096,155 | A | 8/2000 | Harden et al. | 156/250 |
| 6,201,629 | B1 | 3/2001 | McClelland et al. | 359/223 |
| 2003/0133646 | A1 * | 7/2003 | Reznichenko | 385/18 |

OTHER PUBLICATIONS

H. Toshiyoshi and H. Fujita, *Electrostatic micro torsion mirrors for an optical switch matrix*, J. Microelectromechanical Systems, 5(4) 1996. pp. 231–237.

Callaway et al. *Array Light Valve Switches Information Signals Between Fiber Optic Signal Conductors*, IBM Technical Disclosure Bulletin, 27(2) 1984 pp. 1119–1120.

M.F. Dautartas et al., *Silicon Based Moving Mirror Optical Switch*, J. Lightwave Tech. 10(8) 1992, pp. 1078–1085.

K.E. Peterson, *Silicon torsional scanning mirror*, IBM J. Res. Develop., 24, 1980, pp. 631–637.

Peter Heywood, *Dark Horse Joins Optical Switch Race*, Light Reading—The Global Site for Optical Networking, www.lightreading.com, Mar. 5, 2002, pp. 1–2.

*The Demand for All–Optical Switching*, C–Speed—Overview and C–Speed—Core Technologies, www.cspeed.com, Mar. 5, 2002.

*OMM—MEMS Switch Products*, OMM, Inc.—2D Products Brochure, www.omminc.com, Mar. 5, 2002.

U. Breng et al., *Electrostatic micromechanic actuators*, J. Micromechanics and Microengineering, 2(4) Dec. 1992, pp. 256–261.

* cited by examiner

*Primary Examiner*—Hemang Sanghavi
*Assistant Examiner*—Omar Rojas
(74) *Attorney, Agent, or Firm*—Weingarten, Schurgin, Gagnebin & Lebovici LLP

(57) ABSTRACT

A micro-electromechanical optical switch assembly is provided for an optical network. The switch assembly includes arrays of input and output optical fibers and optical components for selecting light paths that connect any selected pair of input and output fibers. The optical components include optical switching elements, such as torsionally supported micromechanical mirrors that are electrostatically actuated to rotate to direct the light beam along the desired light path. The mirrors are bulk micromachined into a semiconductor wafer, preserving their optical qualities, and formed into a chip mated to a cover. The package incorporates alignment elements to ensure correct position and orientation of the optical components in the package.

110 Claims, 19 Drawing Sheets

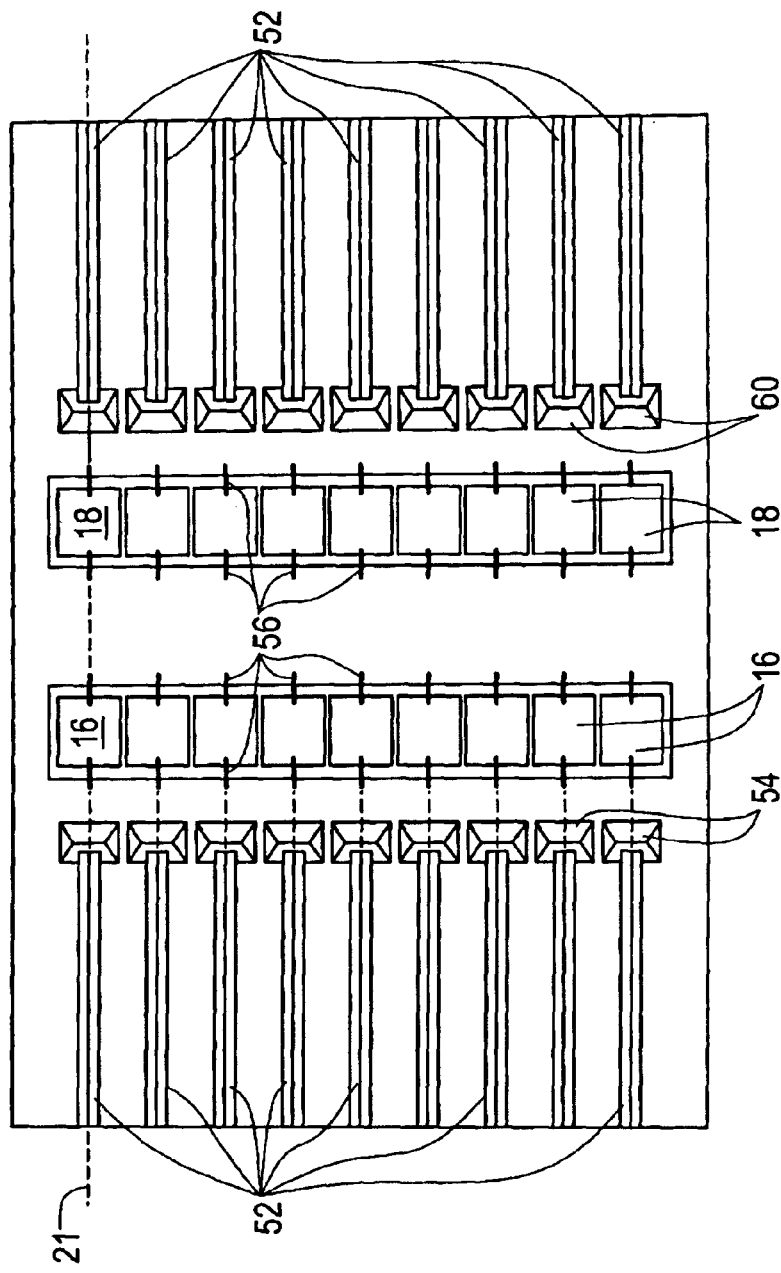
*FIG. 5*
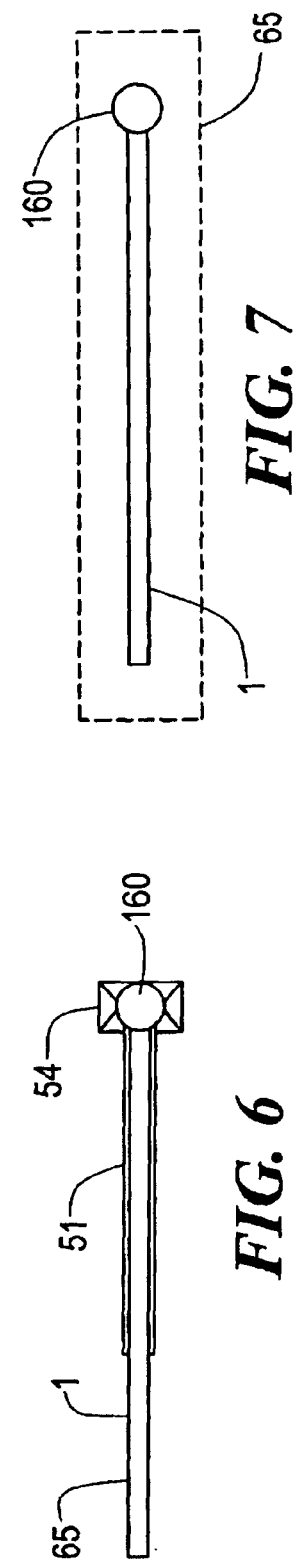
*FIG. 6*
*FIG. 7*

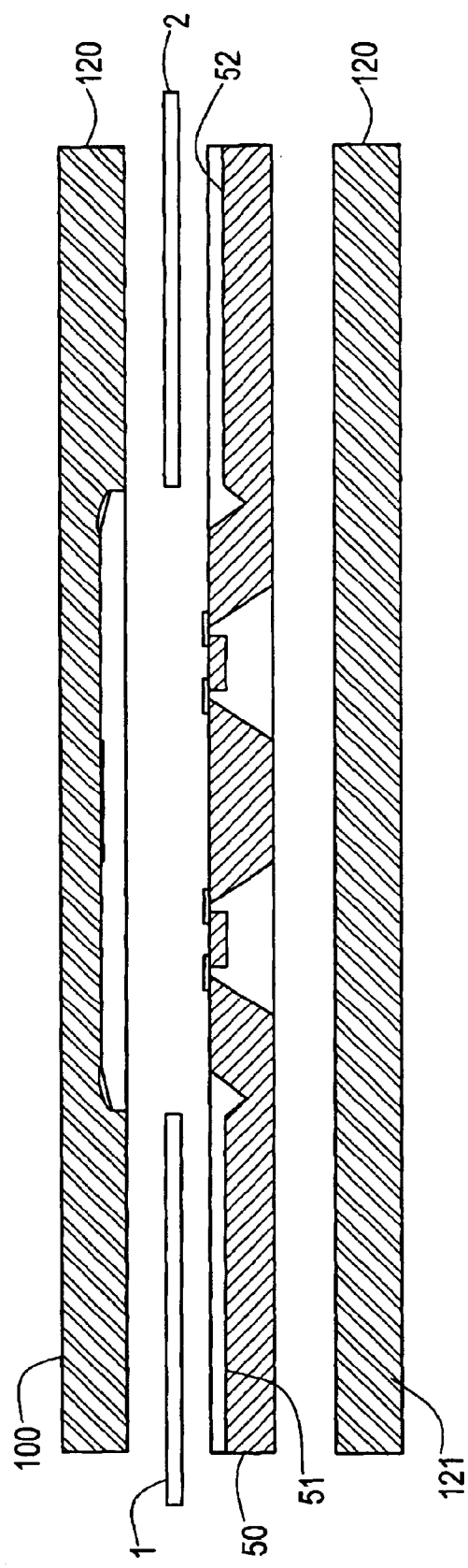
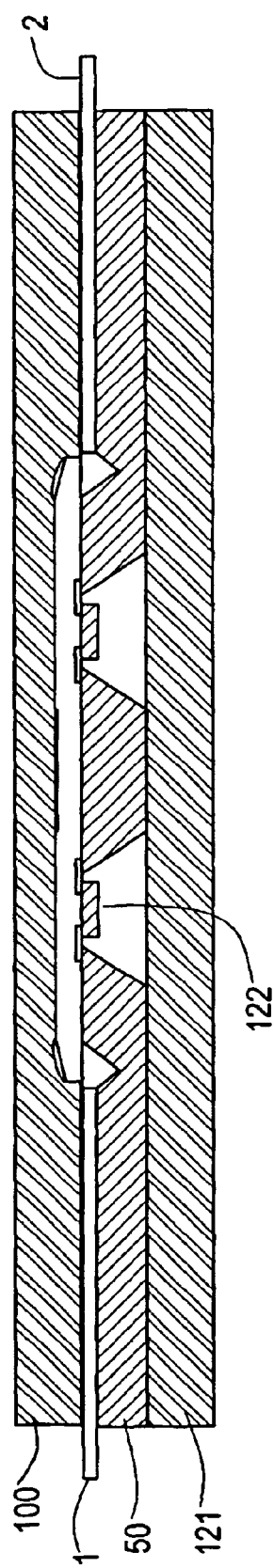
FIG. 12
FIG. 13

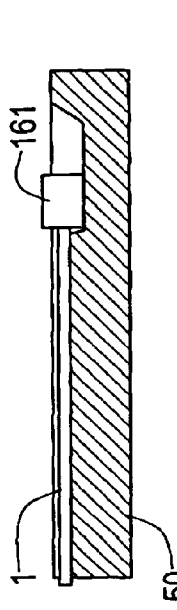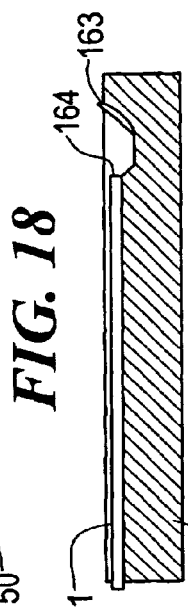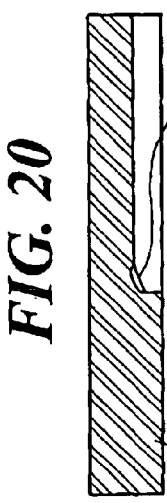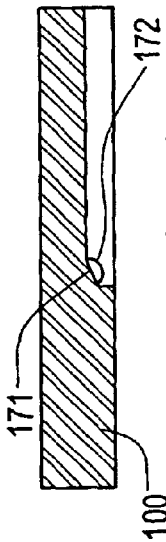
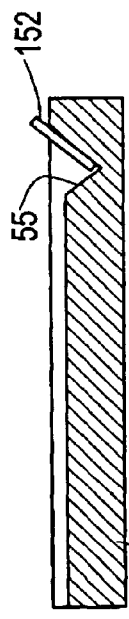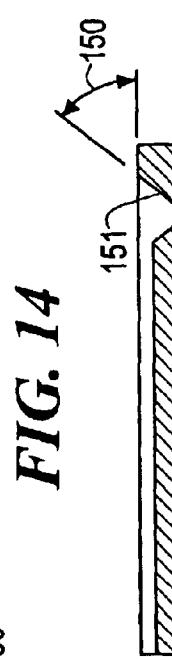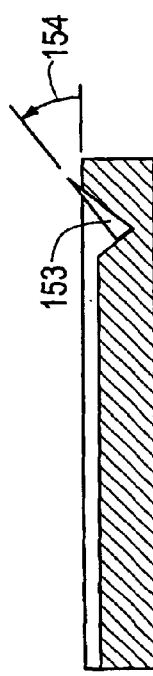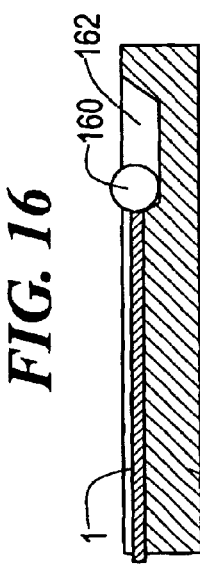

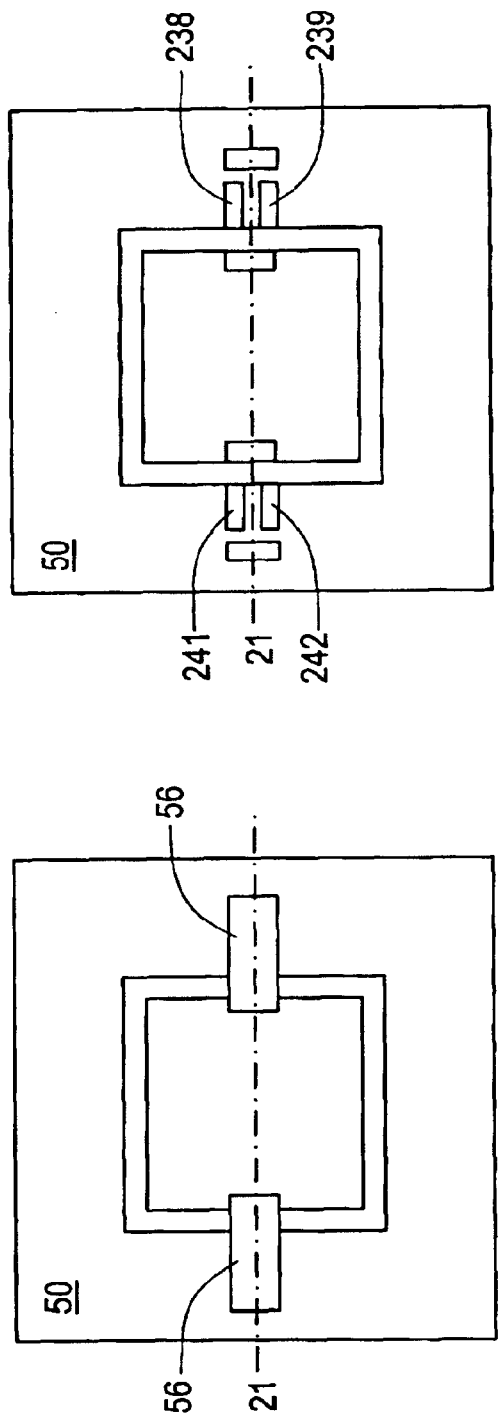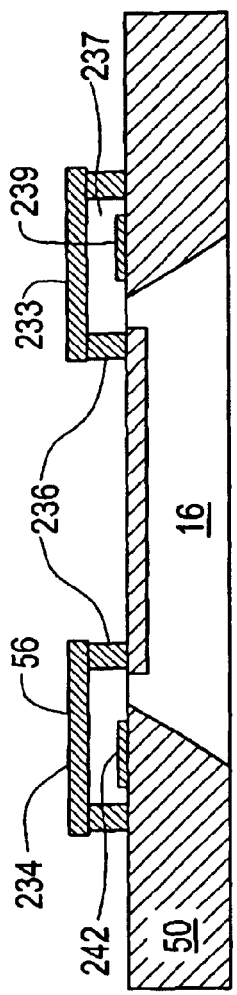
FIG. 31
FIG. 30
FIG. 29

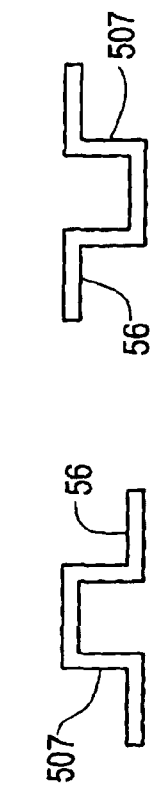
FIG. 33
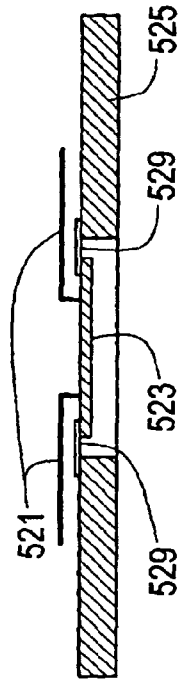
FIG. 34
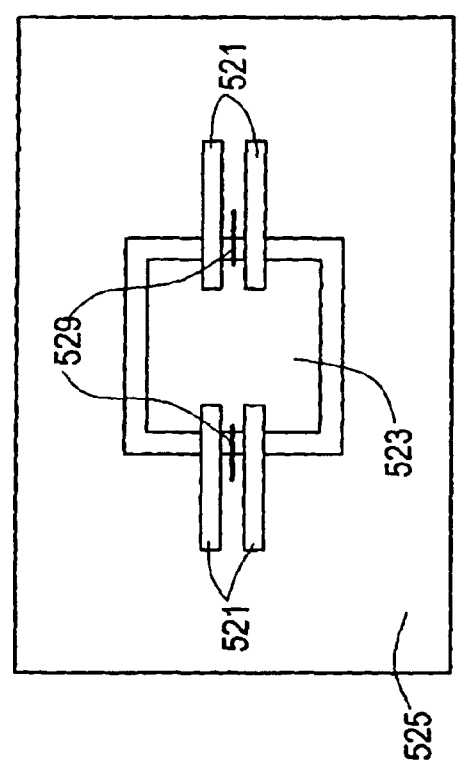
FIG. 37
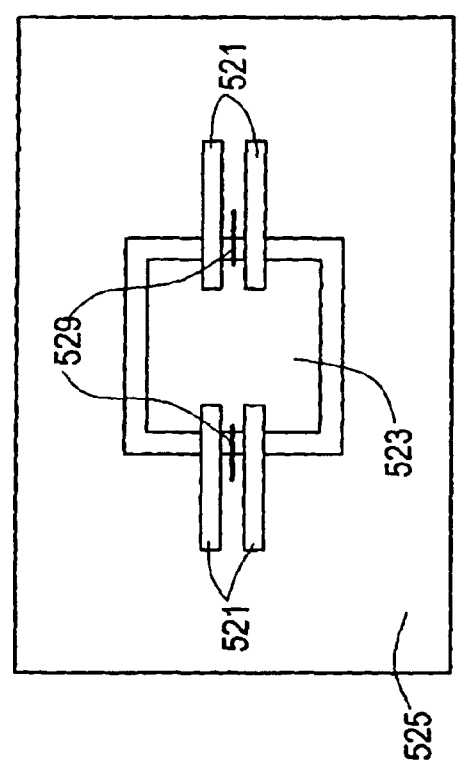
FIG. 38
FIG. 35
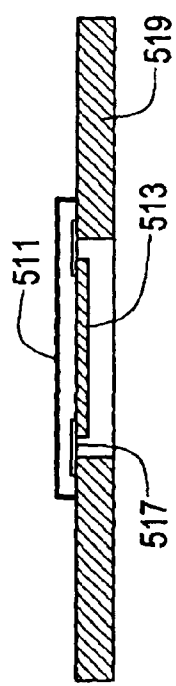
FIG. 36
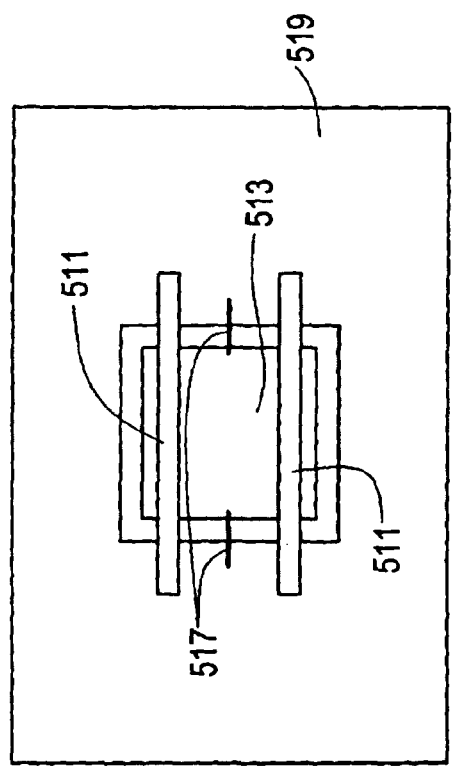
FIG. 39
FIG. 40

MICRO-ELECTROMECHANICAL OPTICAL SWITCH ASSEMBLY FOR OPTICAL DATA NETWORKS

CROSS REFERENCE TO RELATED APPLICATIONS

This application claims priority under 35 U.S.C. §119(e) of U.S. Provisional Application No. 60/273,590, filed Mar. 5, 2001, the disclosure of which is incorporated by reference herein.

STATEMENT REGARDING FEDERALLY SPONSORED RESEARCH OR DEVELOPMENT

This invention was made with Government support under Contract No. DAAH01-01-C-R023. The Government has certain rights in the invention.

BACKGROUND OF THE INVENTION

Optical signals in fiber-optic networks may be switched either electronically, by converting the signal to electronic format and back, or optically in the signal's native format. Electronic switching of optical networks can create bottlenecks caused by the time required to change the signal from optical to electronic format and back. Furthermore, the electronic switch element must be replaced whenever a network is upgraded to higher bandwidths or additional channels. In contrast, optical switches do not require signal conversion and are transparent to the number of channels, wavelength, or bandwidth.

Several technologies have been proposed for optical switching. The development of micro-electromechanical (MEMS) technology for fabricating large numbers of mirrors in small volumes has made it practical to use mirrors for switching optical signals in free space. There are two general configurations for mirror-based switching. In the first configuration, referred to as 2D or $N^2$ designs, a mirror is associated with every possible pair of input and output fibers. The mirrors for this configuration have two distinct states, "on" to connect the pair and "off" to disconnect them. The number of mirrors required in the switch increases as the square of the number of channels. The other configuration is the 3D or 2N configuration, in which each input and output fiber has a mirror associated with it, and the mirrors rotate to N different positions to connect the desired pairs. The number of mirrors increases linearly with the number of channels. Such a geometry is described, for example, by Callaway et al. "Array Light Valve Switches Information Signals Between Fiber Optic Signal Conductors," *IBM Technical Disclosure Bulletin*, 27(2) 1984 pp. 1119–1120.

In the past, optical switches have tended to have high insertion losses, requiring the incorporation of optical amplifiers into the network. Optical switches also have strict alignment requirements. In existing implementations, optical mirror arrays used for switching have been mechanically separate from the optical fibers used to carry the signal and from other passive optical elements, requiring continuous monitoring of and adjustments to the alignment of the various system components. Most of the mirror switching fabrics proposed for optical network switching have been based on surface micromachined polysilicon technology, which limits the optical performance of the mirrors. Finally, optical switches typically have no mechanism for reading the data stream, and thus must be integrated with electronic logic circuits to read and decode the data and determine the required paths.

Lucent Technologies has disclosed an all optical network switch that uses biaxial MEMS mirrors to switch between as many as 256 input and output fibers. The mirrors are electrostatically actuated and gimbal mounted to provide the two dimensions of motion. The mirrors are arranged in a two-dimensional array, as are the optical fibers. The mirror and fiber arrays are aligned to face each other on an axis perpendicular to the fiber axis and the mirror normal. The optical system also incorporates a fixed mirror at an angle to the mirror array. Each fiber is associated with a mirror in the array; to connect an input fiber and an output fiber, the mirrors move to view each other through the fixed mirror. The mirrors, however, are surface micromachined of polysilicon, which limits both the surface quality of the mirror and the stiffness of the mirror body, limiting their optical performance. In this switch design, the MEMS chip that carries the mirror is packaged separately from the optical fibers and lenses and from the fixed mirror, which requires fine alignment both during the assembly and in use.

Optical Micro Machines (OMM) has demonstrated the switching of live network traffic using its optical switch based on polysilicon mirrors fabricated using standard CMOS and VLSI technology. The mirrors are gimballed to move in two dimensions. The current implementation uses so-called 2D technology.

Integrated Micromachines (IMMI) fabricates optical switches using mirrors fabricated of single crystal silicon using bulk, micromachining. This improves the optical quality of the mirrors and reduces the insertion loss of the switch to 1.5 dB. The mirrors are larger than used in competitive switches. This simplifies the optical alignment of the device, but results in a larger device size and increases the force that must be generated by the actuation mechanism. IMMI uses an electromagnetic drive for the mirrors, which can generate large forces but concomitantly uses more power.

The MEMS literature describes several other mirrors intended for use as optical switches. Most have not been demonstrated for switching, more than 2×2 fibers. Toshiyoshi describes a silicon torsion mirror for use as a fiber optic switch. H. Toshiyoshi and H. Fujita, "Electrostatic micro torsion mirrors for an optical switch matrix", *J. Microelectromechanical Systems*, 5(4) 1996. pp. 231–237. The Toshiyoshi mirror is a relatively large device (400 $\mu$m on a side and 30 $\mu$m thick) that rotates about an axis close to one edge of the mirror. The mirror is defined by etching the silicon wafer from the front, and the excess wafer material is etched from the back of the wafer. The supports are very thin, and the resonant frequency of the device is 75 Hz, too slow for network applications. The optical design is suitable for a 2D switch layout, and apparently has not been generalized into a commercially producible switch. A similar approach to switching is described by Dautartas et al.; see M. F. Dautartas et al., "Silicon Based Moving Mirror Optical Switch," *J. Lightwave Tech.* 10(8) 1992, pp. 1078–1085.

Optical switch designs for switching between several input fibers and several output fibers exist in the patent literature. Young et al., in U.S. Pat. No. 6,091,967, have disclosed a design for an M×N optical switch that uses, orthogonally aligned input and output fiber arrays with mirrors at the intersection of the optical path. This is a 2D design that uses a large number of mirrors for a moderate numbers of fibers. Furthermore, the details of the mirror fabrication, assembly, and alignment are not discussed. Bishop, in U.S. Pat. No. 6,031,946, has disclosed a switch consisting of two optical fibers with collimating and focusing optics and a moving mirror to switch between the on and off states. These patents generally do not discuss the detail of manufacturing the mirrors or of integrating the elements into a network switch device.

The creation of integrated optical systems on multiple wafers to be joined by bonding wafers and then dicing the wafer assembly into individual die has been disclosed by Harden et al. See U.S. Pat. Nos. 6,096,155 and 5,771,218. These patents teach methods for fabricating passive optical elements, and especially diffractive elements, on one or both sides of two wafers, by methods such as etching or embossing. In addition, they teach the attachment of free optical elements in a self-aligning fashion by using solder pads on both the wafer and the element. The two wafers are bonded using solder or adhesive, and the resulting stack is then diced and packaged. The bonding process protects the optical elements from the dicing slurry.

SUMMARY OF THE INVENTION

The invention described here is an optical switch based on MEMS (micro-electro-mechanical) mirrors for switching fiber-optic data networks. The MEMS chip that carries the switching mirror arrays also has alignment features and passive optical components. It is mated to a cover that incorporates corresponding alignment features and passive optical components and that also forms part of the package. The alignment features serve to ensure the correct position and orientation of the optical components in the package cover relative to the optical components on the silicon chip. The connection to the rest of the optical network is achieved via optical fibers which are held in position by being placed in grooves, also micromachined into the MEMS chip. The alignment elements and grooves serve to simplify the assembly of the device and to maintain the optical alignment in use. The mirrors are bulk micromachined, preserving the optical qualities of the semiconductor wafer. Additionally, detectors may be integrated into the MEMS chip or even into the mirrors themselves to interface with the logic circuits controlling the switch.

By incorporating the alignment elements and optics into the package, the present invention achieves a number of improvements over the prior art. The device is considerably smaller than can be achieved by aligning separately packaged, fiber arrays, mirrors, and optics. The alignment is easier to establish as well as more robust, reducing initial costs and allowing the device to be used in environments subject to mechanical disturbances, such as vibrations or high acceleration.

The switching mirrors are electrostatically actuated, with high switching bandwidths, very low power consumption, and high reflectivity. The other optical elements are passive and coated with high efficiency reflective coatings. Thus the resulting device is low in cost while permitting high optical bandwidth, rapid switching, and low insertion losses. The minimum size of the mirrors is determined by the maximum beam diameter, as determined by the optical system design.

DESCRIPTION OF THE DRAWINGS

The invention will be more fully understood from the following detailed description taken in conjunction with the accompanying drawings in which:

FIG. 5 is a plan view of a further embodiment of a chip;

FIG. 6 is a partial plan view of the chip of FIG. 5 with a fiber assembly;

FIG. 7 is a schematic view of a fiber assembly of FIG. 6;

FIG. 12 is an exploded cross-sectional side view of the optical switch assembly according to the present invention;

FIG. 13 is a cross-sectional side view of the switch assembly of FIG. 12;

FIG. 14 is a partial side view of a lower turning element of the optical switch assembly;

FIG. 15 is a partial side view of a further embodiment of the lower turning element;

FIG. 16 is a partial side view of a still further embodiment of the lower turning element;

FIG. 17 is a partial side view of a fiber assembly incorporating a collimating component;

FIG. 18 is a partial side view of a further embodiment of a fiber assembly incorporating a collimating component;

FIG. 19 is a partial side view of still further embodiment of the lower turning element;

FIG. 20 is a partial side view of an upper turning element of the optical switch assembly;

FIG. 21 is a partial side view of a further embodiment of the upper turning element;

FIG. 22 is a partial side view of a still further embodiment of the upper turning element;

FIG. 29 is a plan view of a MEMS micromirror switching element of the optical switch assembly;

FIG. 30 is a side view of the MEMS micromirror switching element of FIG. 29;

FIG. 31 is a plan view of the micromirror of FIG. 29 with the springs removed;

FIG. 33 is a schematic illustration of a torsional spring with a stiffening rib;

FIG. 34 is a schematic illustration of a further embodiment of a torsional spring with stiffening ribs;

FIG. 35 is a schematic illustration of a torsional spring with a stepped protrusion;

FIG. 36 is a schematic illustration of a further embodiment of a torsional spring with a stepped protrusion;

FIG. 37 is a cross-sectional side view of an embodiment of a micromirror in which the actuation mechanism is separated from the mirror support;

FIG. 38 is a plan view of the micromirror of FIG. 36;

FIG. 39 is a cross-sectional side view of a further embodiment of a micromirror in which the actuation mechanism is separated from the mirror support;

FIG. 40 is a plan view of the micromirror of FIG. 39;

DETAILED DESCRIPTION OF INVENTION

Figure 1:
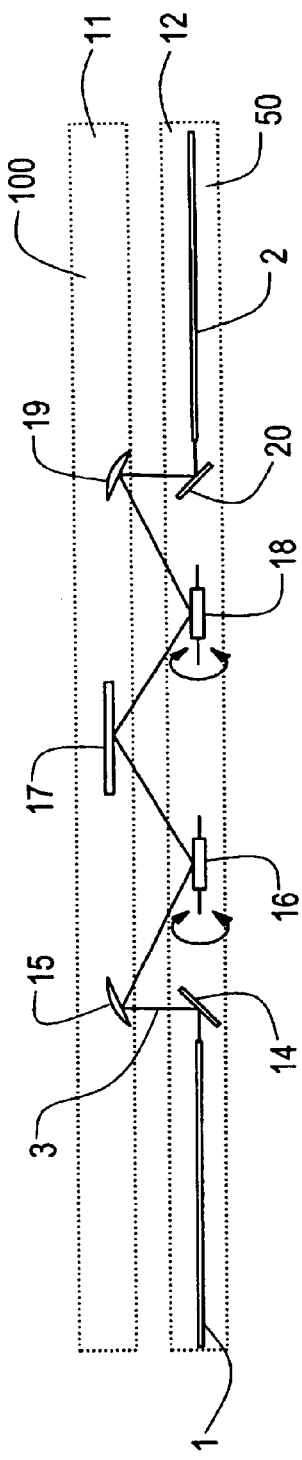
FIG. 1 is a side view of an optical layout of a microelectromechanical optical switch assembly according to the present invention.
Figure 2:
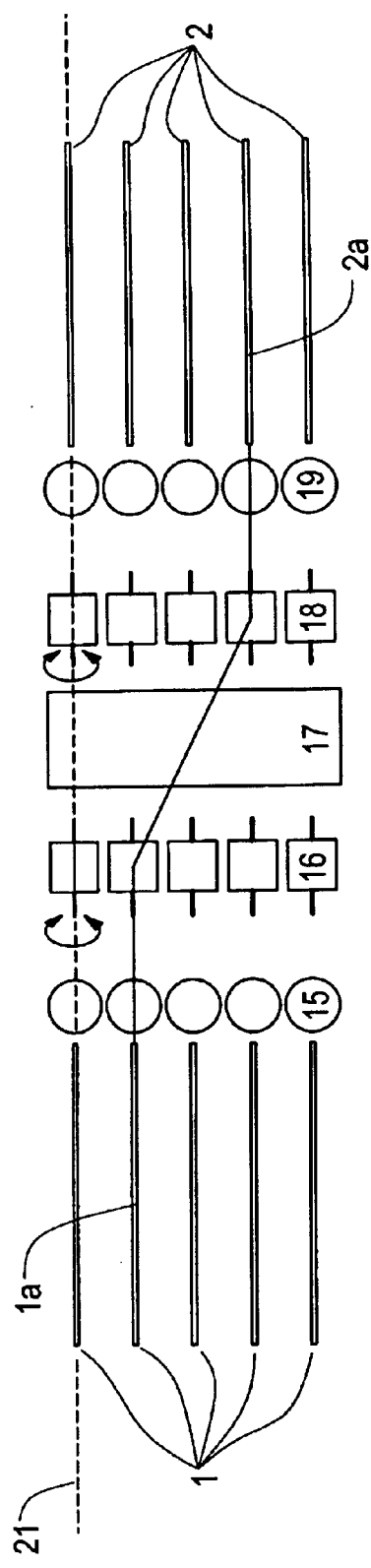
FIG. 2 is a plan view of the optical layout of the switch assembly of FIG. 1.

FIGS. 1 and 2 show a layout of an optical system for an optical switch according to the present invention. The optical system consists of one or more input fibers 1 and one or more output fibers 2, and the optical components for selecting the light paths that connect any pair of input and output fibers. The optical layout may be considered in two planes or strata, the upper plane or stratum 11, which includes components supported by a cover 100, and the lower plane or stratum 12, which includes components supported by a substrate, such as a silicon wafer or chip 50.

The light is introduced into the system in the lower plane 12 by way of a selected input fiber 1a. Upon leaving the fiber, the light beam 3 is reflected by an input optical turning element 14, such as a mirror, and directed into the upper optical plane 11. An optical turning element 15, such as a mirror, in the upper plane redirects the beam back into the lower plane onto an input reflective switching element 16, such as a mirror associated with the selected fiber. The optical elements 14 and/or 15 may also incorporate collimating components, discussed further below. The switching mirror 16 redirects the beam towards an intermediate reflective element 17, such as a fixed mirror, in the upper plane, which reflects the beam back towards an output reflective switching element 18, such as a mirror associated with the selected output fiber 2a. From the switching mirror, the light is reflected back to an optical turning element 19, such as a mirror, to reflect the light back toward an output optical turning element 20, such as a mirror, which directs it into the output fiber. The elements 19 and/or 20 may also incorporate focusing components to focus the light. To connect a chosen pair of input and output fibers, the input switching mirror 16 rotates about its axis 21 in the direction that translates the beam toward the output switching mirror 18 associated with the output fiber. The required angle is that which centers the beam on the output mirror 18. The output mirror 18 also rotates about its axis in the opposite direction, toward the input mirror. This rotation serves to direct the beam reflected from the output mirror into the output fiber.

Figure 3:
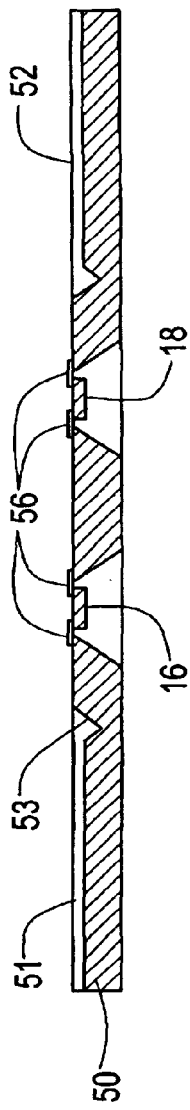
FIG. 3 is a cross-sectional side view of a microelectromechanical chip according to the present invention.
Figure 4:
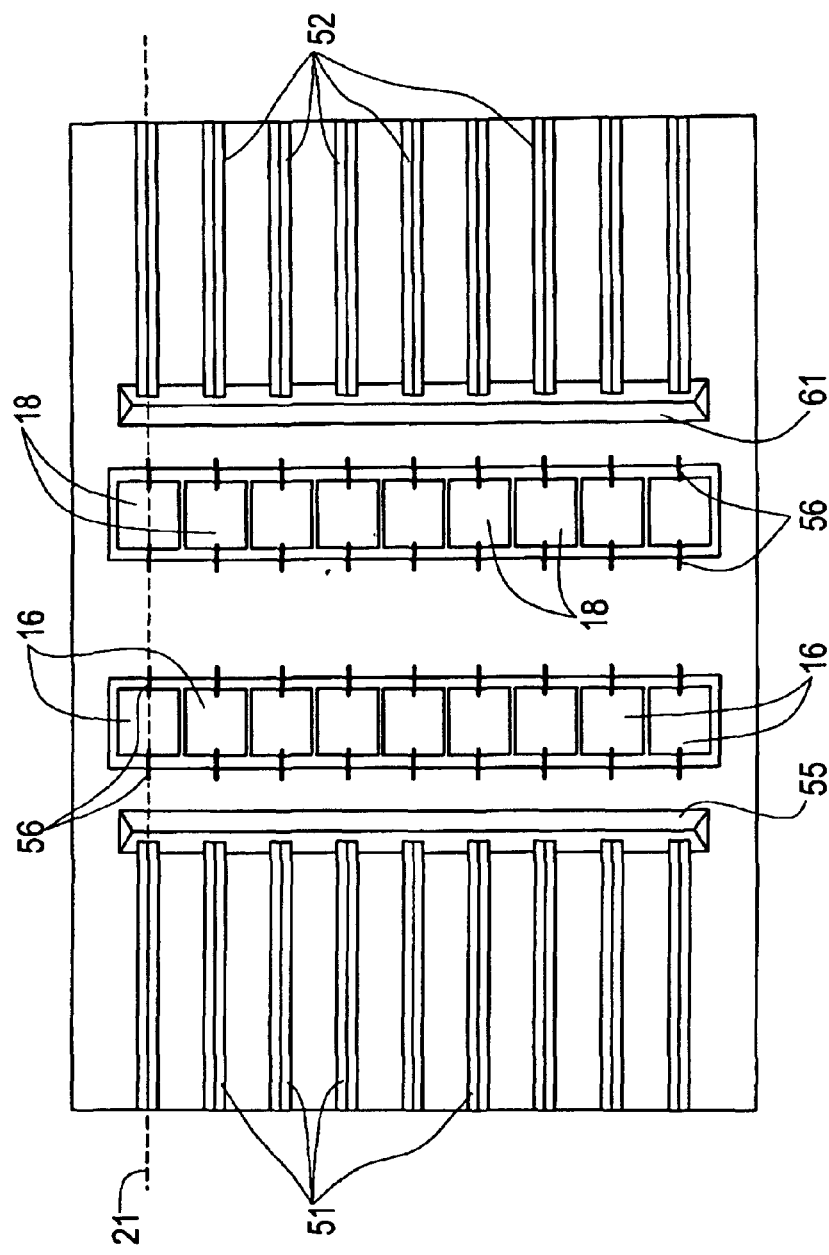
FIG. 4 is a plan view of the chip of FIG. 3.

FIGS. 3 and 4 illustrate the lower portion of the optical system that is incorporated on the MEMS chip 50. An array of fiber alignment grooves 51 is provided for the input fibers 1, and a similar array 52 is provided for the output fibers 2. Each input fiber array has associated with it an elongated groove 55 in which the input optical turning element 14, such as one or a plurality of mirrors, is placed to direct the light to the upper plane. Each output fiber array also has associated with it an elongated groove 61 in which the output optical turning element 20, such as one or a plurality of mirrors, is placed to receive light from the upper plane and direct it toward the fiber.

FIG. 5 shows a further embodiment in which a plurality of separate grooves 54 are provided, each groove holding an individual mirror 14 associated with each input fiber. Similarly, a plurality of separate grooves 60 are provided, each groove holding an individual mirror 20 associated with each output fiber. This configuration is advantageous, for example, if optical elements, such as lenses 160, were to be attached to the fibers 1 before the fibers were incorporated into the device (see FIGS. 6 and 7). In this case, the combination of grooves 51 and 54, or 52 and 60, position the fiber and lens assembly 65 during the assembly.

Each fiber also has associated with it a movable MEMS mirror 16, 18 that forms the active switching element, described further below. Each MEMS mirror is suspended by a pair of surface micromachined torsion springs 56 that allows the mirror to rotate about the axis 21 parallel to the fiber axis.

Figure 8:
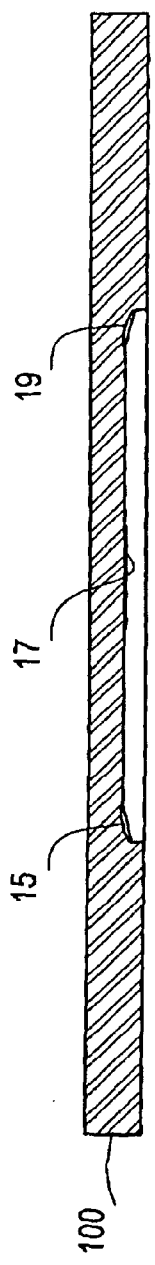
FIG. 8 is a cross-sectional view of a cover for the chip of FIG. 3.
Figure 9:
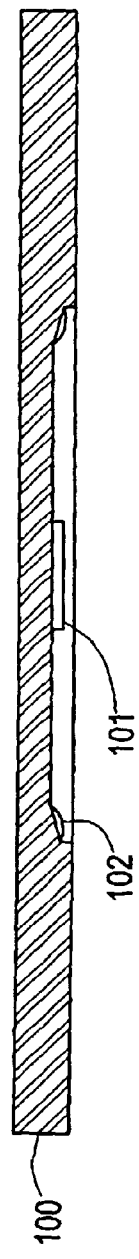
FIG. 9 is a cross-sectional view of a further embodiment of the cover.
Figure 10:
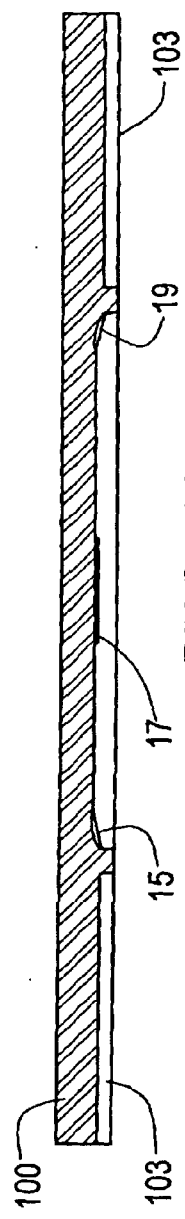
FIG. 10 is a cross-sectional view of a still further embodiment of the cover.

FIGS. 8–10 illustrate various embodiments of the cover 100. In the preferred embodiment of the invention, the cover contains embedded turning mirrors 15, 19 and fixed mirror 17 as well as lenses and alignment features as needed. The material may be optically transparent or opaque, but must be dimensionally stable. The cover may be made by any convenient method including casting, injection molding, stamping, machining, or a combination of techniques. The surface of the flat mirror 17 is preferably created during the cover fabrication process, for example, by incorporating a flat surface into the mold. Alternatively, a mirror 101 may be fabricated separately and attached to the cover. The turning and flat mirror surfaces may then be coated in a second operation, and separately optical elements 102 may be glued to the turning mirrors if required. The cover may optionally include recesses 103 corresponding to the fibers. These may serve for system alignment or to accommodate fibers that extend beyond the surface of the MEMS chip 50 or both purposes.

Figure 11:
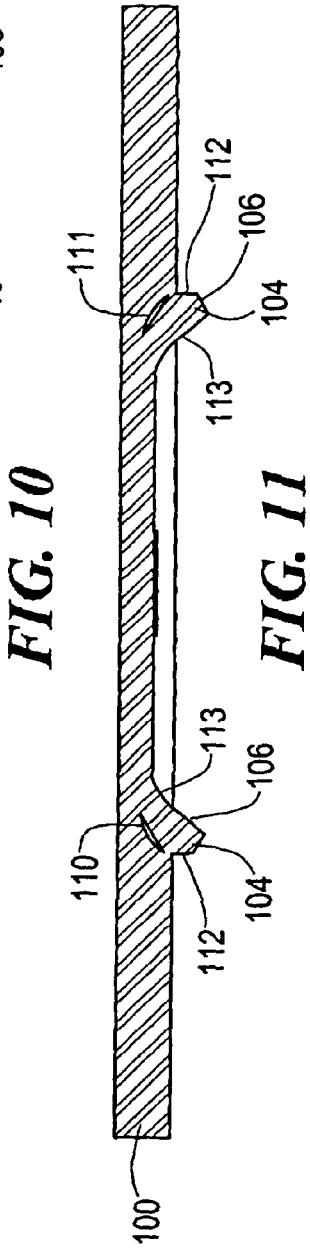
FIG. 11 is a cross-sectional view of a still further embodiment of the cover.

A further alternative embodiment the optical system is shown in FIG. 11. The cover 100 is manufactured of an optically transparent substance and has protrusions 104 that extend into the lower plane 12 of the optical system below the axis of the optical fibers 1 and 2. These protrusions mate with the grooves 54, 60 or 55, 61 in the MEMS substrate 50. The turning mirrors 14, 20 are incorporated in the protrusions by coating the surfaces 106 with a reflective coating, or by utilizing total internal reflection to reflect the light and direct it into the upper plane 11. Optical elements 110, 111 embedded in the cover serve to shape the light beam profile as well as redirect the light toward, the MEMS mirrors. The surface 112 of the protrusion near the fiber and/or the surface 113 of the protrusion facing the MEMS mirrors may be optionally shaped to modify the beam profile using refraction or diffraction.

Referring to FIGS. 12 and 13, optical fibers 1, 2 fit into the input and output fiber groove arrays 51, 52 in the chip, and may also fit into mating arrays of grooves 103 in the cover if provided. The cover is bonded to the chip, possibly using an adhesive 120 such as epoxy. Alignment elements in the cover 100 and chip 50, discussed further below, define the relative position and orientation of the various optical elements and assure optical alignment of the final switch. In the preferred embodiment of the device, a second cover 121 is used to seal the bottom of the chip to complete the device package. Alternatively, the chip and top cover may be mounted in a standard or customized semiconductor package.

A hermetically sealed cavity 122 is preferably formed around the chip, as by the top and bottom covers. This cavity may contain vacuum, air, or other inert gas. Alternatively, the cavity may contain an optically transparent and electrically insulating liquid, such as oil or glycerin. The purpose of the liquid may be to provide mechanical damping to avoid undesirable oscillation or to improve the shock resistance of the device. The liquid may also be used to amplify the electrostatic force for a given voltage by the dielectric constant of the liquid or to reduce the optical divergence of the beam by the index of refraction of the liquid. It will be appreciated that the liquid may be selected to provide some combination of these functions. Use of an optical fluid is discussed further below.

Other techniques may be used to form the cover. The cover could be made of a flat material such as a PYREX® or glass substrate or some other material that may or may not be optically transparent. The material may be chose for a particular property, such as thermal expansion matched to silicon. The flat mirror could be formed, for example, by coating regions of the cover surface with a suitable reflective coating. The angled mirrors and the collimating components, if any, could be attached to the flat mirror using adhesive or solder. Alternatively, cavities could be provided in the cover for attaching recessed optical components.

The chip package may be made of plastic, glass, ceramic material, or a second silicon wafer. The material may be chosen to minimize misalignments due to ambient temperature changes or temperature gradients. The optical components may be formed into the package by molding, pressing, or machining, or may be separately fabricated and attached to either the package or the MEMS chip.

FIGS. 14–22 show details of the passive optical elements. Referring to FIGS. 14 and 15, in the preferred embodiment, the lower input optical turning element 14 may be a flat mirror coating 151 or a separate-mirror 152 placed in the groove 55 (or 54) in the substrate 50 to redirect the light towards the upper plane, where a collimating optical element is located. The folding mirror 151 must be large enough to capture a sufficient fraction of the beam exiting from the end of the input fiber. Individual mirrors may be associated with each fiber, or a single long mirror may be used for the entire array of input fibers. An anisotropic silicon etch may be used to create a surface along an atomic plane of silicon at an angle 150 which may measure 54.7° to the wafer surface. This surface may be used to define the mirror angle. If the surface is sufficiently smooth, it may be coated to serve as the mirror 151. Alternatively, the separate mirror 152 may comprise a mechanical support and a reflecting surface, such as a coated glass first surface mirror, attached to the angled surface in any suitable manner, for example with epoxy adhesive. In a further alternative, the separately attached mirror may be a wedge shaped element 153, which places the mirror surface at some chosen angle 154, for example 45°, which may be different from the angle of the etched surface, to simplify the optical system. See FIG. 16.

The light beam diverges as it exits the optical fiber, with a divergence angle that is characteristic of the fiber. Thus the downstream optical components must be sufficiently large to accommodate the larger beam diameter, and/or the light must be collimated. The collimating element may also be a diffractive element, or some combination of reflective, refractive, and/or diffractive elements.

Optionally, the collimating optical components may be placed in close proximity to the input fiber 1. This minimizes the required size of the optical components. There are several choices of passive optical components that may be used for collimation, as shown in FIGS. 17–19. A ball lens 160 or gradient index (GRIN) lens 161 may be glued to the fiber 1 or placed in close proximity. The position of the lens may be defined using a groove 162 or pyramidal pit etched into the surface of the wafer. An alternative embodiment uses a curved mirror 163 in close proximity to the fiber end 164 to both collimate the beam and change its direction. Alternatively, the collimating element may be incorporated into the turning mirrors 15,19 in the cover as in FIGS. 20–22. The collimating and turning functions may be combined by using curved mirrors 170. Alternatively, an angled flat mirror 171 may be used in combination with a lens 172 molded into or attached to the surface. The lens may have a spheric or aspheric surface and may consist of one or more elements. The collimating element 172 may also be a diffractive element.

At the output fiber 2, the optical elements for turning and focusing the beam may be the same or different from the optical elements used for, the input fibers, although they generally utilize the same or similar types of components described above. For example, a lens or mirror is used to refocus the beam and inject it into the output fiber.

Figure 23:
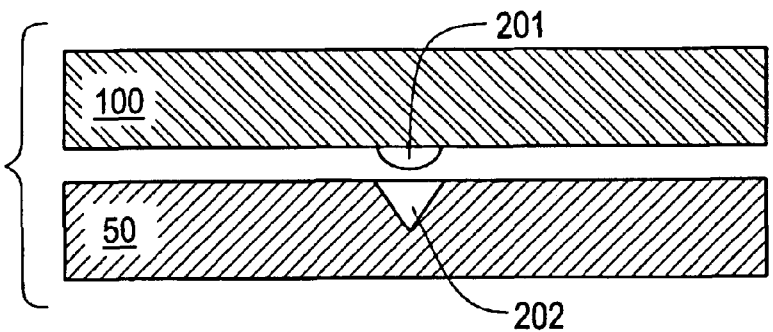
FIG. 23 is a partial side view of an alignment element of the optical switch assembly.
Figure 24:
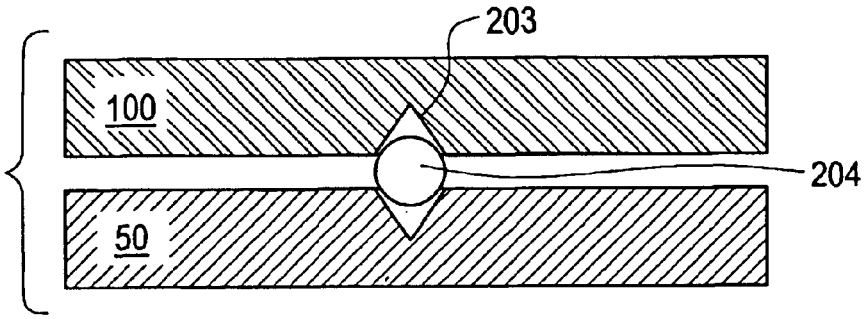
FIG. 24 is a partial side view of a further embodiment of the alignment element.
Figure 25:
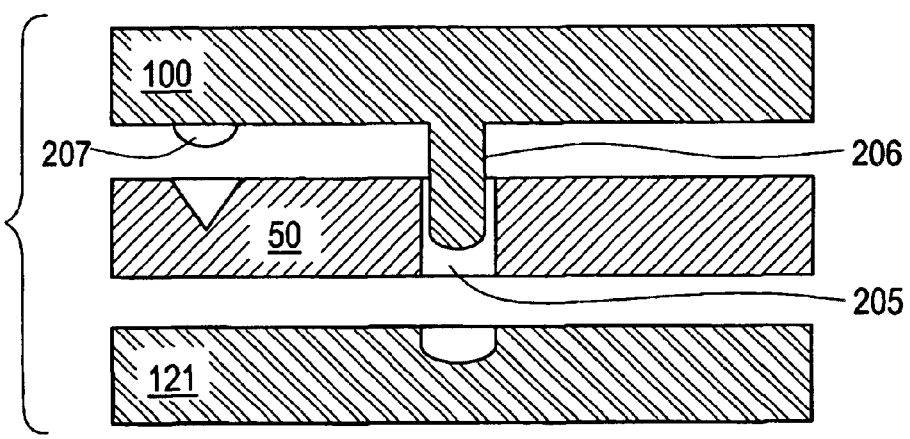
FIG. 25 is a partial side view of a still further embodiment of the alignment element.

FIGS. 23–25 show details of the alignment elements that may be incorporated to assure the optical alignment of the system once it is assembled. Mating fiber grooves 51, 52, 103 may serve this purpose if they are used in both the chip and the cover. Alternatively, features may be provided specifically for the purpose of aligning the substrate 50 to the cover 100. The alignment elements incorporated into the cover may either be pins or raised areas 201 that fit into depressions 202, such as the pyramid-shaped depressions illustrated, formed in the silicon wafer using the anisotropic etch. Alternatively the cover may incorporate dimples or depressions 203. Free elements such as ball bearings 204 could then be used to align the cover to the silicon chip. The alignment features in the silicon chip may also include perforations 205 that pass through the entire chip. In this case, the alignment features 206 in the cover penetrate through the chip and extend to the back to mate with the package bottom. These alignment features could optionally be used in conjunction with other alignment elements 207 to more precisely control the orientation of the optics.

The primary consideration in setting the minimum size of the mirrors for the switch is the divergence of the unconfined light beams. The beam exits the optical fiber with a beam profile that is determined by the properties of the fiber and the input beam and a beam waist at the fiber face. In free space, the beam exhibits angular divergence, typically with a Lorenzian intensity profile, at an angle that depends on the numerical aperture of the fiber. Apertures smaller than the beam diameter at the location of the aperture result in a loss of signal intensity due to energy that does not pass through the aperture, optical noise due to light energy that becomes stray light, and an increase in the downstream size of the beam due to diffraction. The downstream optical components must be made larger in size to capture most of the beam energy, or they can be made smaller and the losses tolerated. For a Gaussian beam, the divergence of the beam is inversely related to the minimum beam diameter (the beam waist), usually at the face of the optical fiber or the focus of a lens, and to its wavelength. The relative size of the elements must accordingly be balanced. Any of the individual elements may be made arbitrarily small using optical elements to place a beam waist on the element, but then the beam divergence increases and, in order to capture all the energy in the beam, the downstream optical elements need to be made larger. This comes about because for very small spot sizes the beams are highly divergent: 14° for a 1 μm wavelength beam with a 5 μm spot. Collimating the beams to, for example, 100 μm gives a divergence of less than 1° and allows the use of 200 μm elements (mirrors and lenses) at reasonable distances (approximately 1 cm) to capture over 90% of the beam energy.

Figure 26:
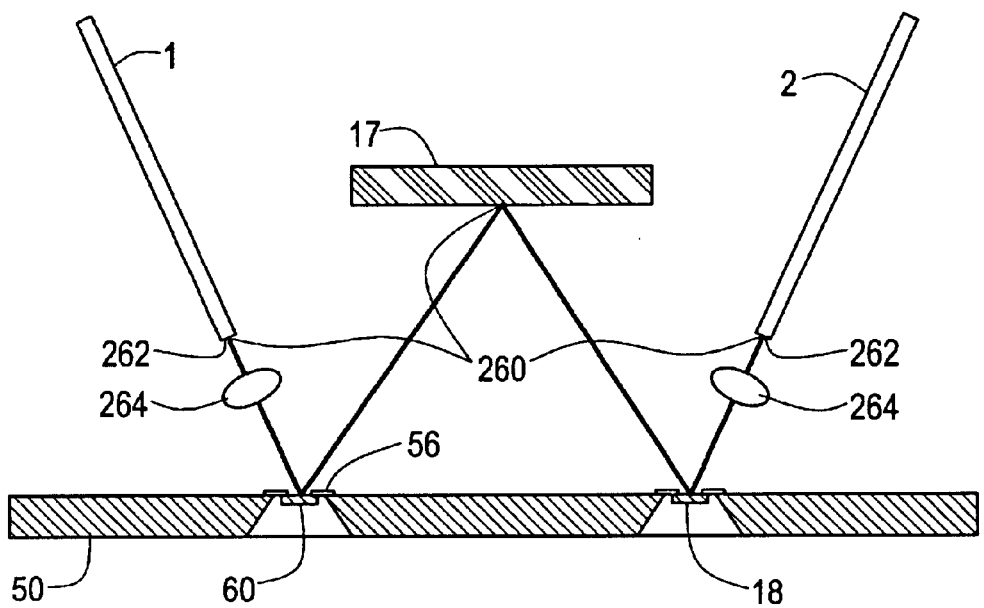
FIG. 26 illustrates a representative schematic optical design geometry for an optical switch assembly.
Figure 27:
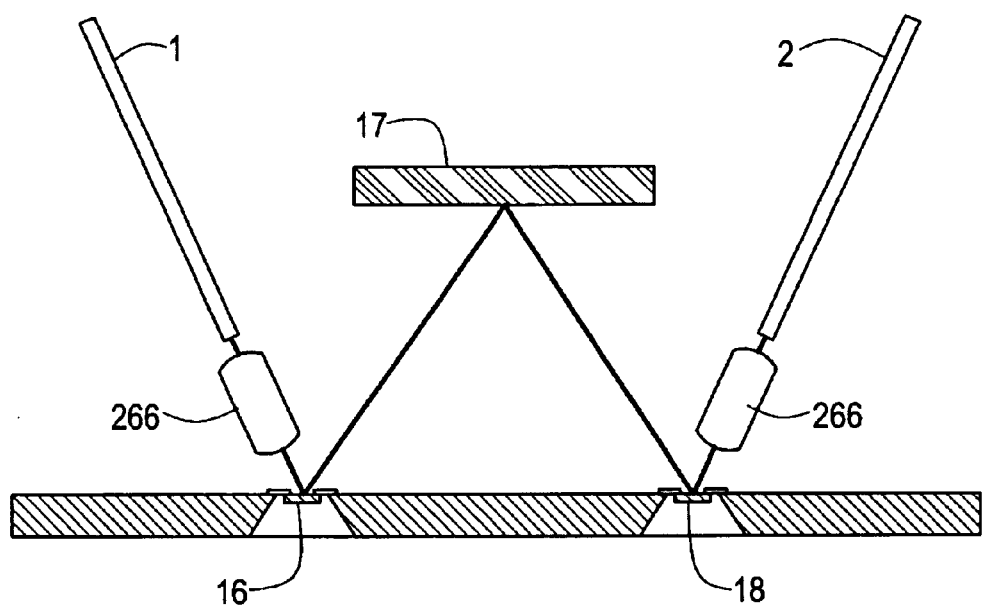
FIG. 27 is a further embodiment of the design geometry of FIG. 26.
Figure 28:
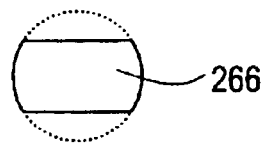
FIG. 28 illustrates a cylindrical or drum lens for use in the embodiment of FIG. 26.

FIG. 26 shows the geometry of a representative optical design for a switch for the purpose of illustrating the design considerations. To clarify the discussion, some of the folds in the optical path have been omitted, although they would be required for efficient fabrication and packaging of the system. The design parameters are meant to illustrate the discussion and are not meant to represent a particular switch. The calculations assume a wavelength of 0.650 μm and single mode fibers with 5 μm mode diameter, and the design attempts to place beam waists 260 at the fiber faces 262 and on the upper fixed mirror 17. Since the length of optical paths are different for the various pairs of input and output fibers, the beam waist positions will be exact only for some of the possible fiber pair combinations. For this design, the incidence angle is 22°, the distance between the arrays is 3.5 mm and the system height is 6.2 mm. The lenses 264 have a focal length in air of 0.742 mm comparable to 1 mm BK7 glass ball lenses. The $1/e^2$ diameter, of the beam is 140 μm at the lens 264, and 120 μm at the MEMS switching mirror 16. If ball lenses are used, they may be reduced in diameter to cylinders 266 of diameter between 0.2 and 0.5 mm to accommodate packing into smaller arrays, as shown in FIGS. 27 and 28. The mirror size is 250 μm×300 μm to capture over 99% of the beam energy. The shortest optical path between any fiber pair in the system is 15.37 mm and the longest path is 15.58 mm. The calculated coupling efficiency (using the ZEMAX optical modeling software package) for both cases is 85%, or −0.7 dB (neglecting reflection losses). The required maximum deflection of the outermost mirrors is 7.9° for center to center mirror array spacing of 500 μm and 5.15° for tightly packed mirrors with center to center spacing of 300 μm.

In the present invention, the mirrors are fabricated using a combination of bulk and surface micromachining. The mirror 16 itself is bulk micromachined from a single crystal wafer. The optical polish of the original substrate is preserved in processing and determines the surface quality of the mirror, which can be coated to enhance its reflectivity. The supports 233, 234 are electroplated metal, usually nickel.

FIGS. 29–31 show a detail of the MEMS torsion mirrors 16. MEMS micromirrors have been developed for miniature scanning displays. See U.S. Pat. No. 6,201,629, incorporated by reference herein. The mirrors are supported by spring structures 56 formed of electroplated springs 233, 234 that are attached to the mirror 16 and the substrate 50 by electroplated posts 236 which define a gap 237 between the spring and the surface of the substrate. Two actuation pads 238 and 239 are placed on the surface of the substrate and on either side of the axis 21 under the spring 233. A second pair of actuation pads 241, 242 is placed under the second spring 234 at the opposite edge of the mirror. Applying a voltage between the springs and the two actuation pads 238, 241 on one side of its centerline causes the mirror to rotate in the direction of the pads. The force obtained for a given voltage depends on the width and length of the pads and the height of the gap. The rotation obtained for a given torque depends on the stiffness of the springs, which depends on the material and their geometry.

For switching applications, the mirrors are designed to be moved to a precise predetermined angle and to hold their position until further instructions are received. The angle may be predetermined by the initial calibration of the system or the angle may be determined using optical or electronic position feedback mechanisms. It is desirable that the mirror motion be achieved with as small a force as possible, so as to minimize the required actuation voltages. This is achieved by making the springs weak. For a given mirror size, weakening the spring reduces the resonant frequency, which limits the achievable switching speed. Using smaller mirrors, however, results in a higher resonant frequency for a given spring design. Smaller mirrors also pack more efficiently into the MEMS chip.

The desired minimum switching speed places a constraint on the minimum resonance frequency of the switching mirrors. For example, a switching speed of 2 ms requires a minimum frequency of 500 Hz. The frequency depends on the ratio of the spring stiffness to the mirror moment of inertia. Having determined the required resonance frequency, reducing the mirror size permits the use of softer or weaker springs, which, as noted above, is desirable to minimize the force necessary to move the mirror to the desired position. The springs can be softened by reducing the width of the springs or the thickness of the metal, by lengthening the spring, or by introducing necked regions in the spring. Calculations show that a 200×200×25 μm silicon mirror with a resonance frequency of 1.5 kHz can be displaced by 7° (total motion range of 14°) using 50 V. The maximum achievable displacement, or alternately the minimum necessary voltage, depends on the particular design of the support spring.

Figure 32A:
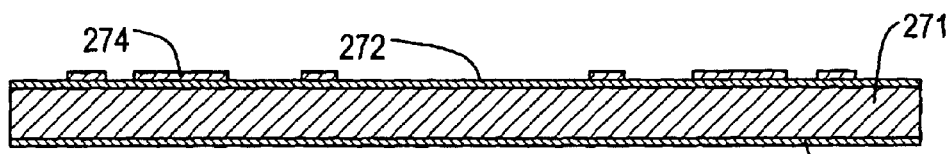
FIGS. 32A–32G illustrate steps in fabrication of a micromirror according to the present invention.

An exemplary fabrication process for forming the micromirror is illustrated in FIGS. 32A–G. A polished wafer 271, preferably Si, is first coated on both sides with a material 272 on the front and 273 on the back that is resistant to etches of the wafer material (FIG. 32A). After application of coating 272, 273, the wafer 271 and coatings 272, 273 are then patterned on both sides with registered alignment marks and etched to define the marks in the crystal. These marks, formed on both sides of the wafer, permit registration of features on the front and back (registration marks are not shown in FIGS. 32A–G).

Figure 32B:
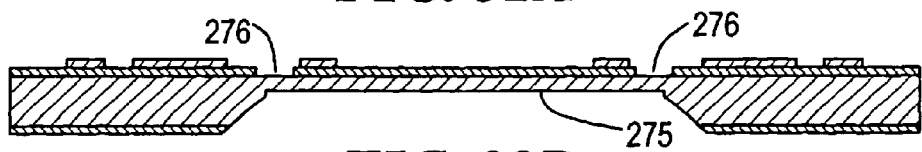

Metal films, for example of chromium, gold, and titanium/tungsten alloy, are deposited on the front coated surface 272, and are patterned and etched to form pads 274 that provide the electrical contacts and anchors for the mechanical structures (FIG. 32B). The coating 273 is patterned and etched to act as a mask for wafer etching. The back of the wafer is then etched to form a membrane with surface 275 having an appropriate thickness. The coating 272 on the front surface is then patterned and etched to form groove openings 276 in the coating which will serve later in the process as an etch mask for the separation of the mirror support structures 284 from the substrate 286. The initial coatings may also include or serve as the final mirror surface.

Figure 32C:
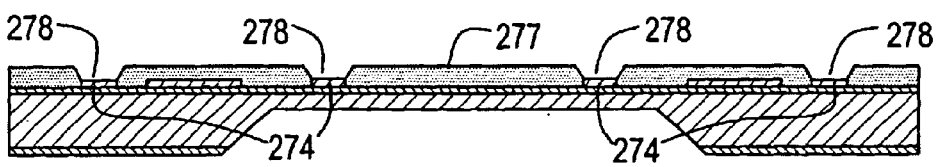
Figure 32D:
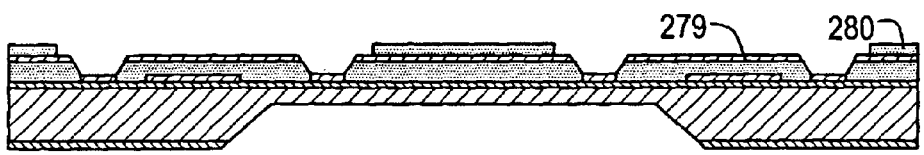
Figure 32E:
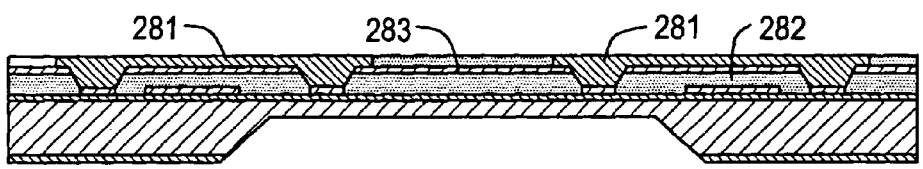
Figure 32F:
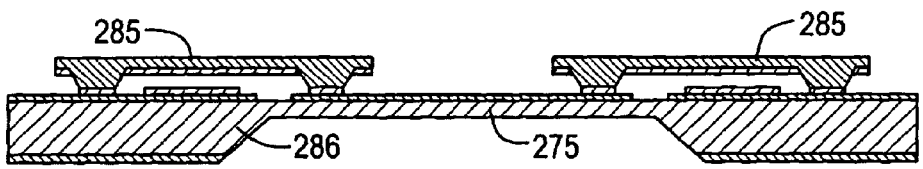
Figure 32G:
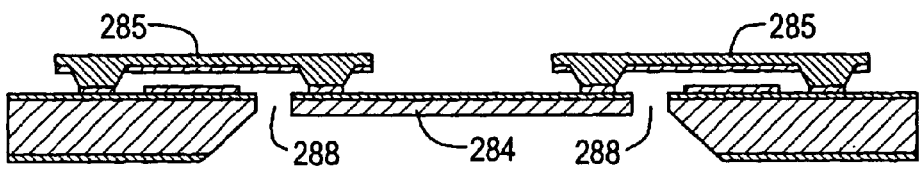

A release layer 277 of photoresist or other material is applied to the front surface and patterned with holes 278 to expose the metal anchors 274 (FIG. 32C). After heat treatment, thin (0.05 μm to 0.5 μm) layers of a metal or sequence of metals such as chromium, gold and titanium/tungsten alloy 279 are deposited on the front surface (FIG. 32D). Photoresist is then applied and patterned to form a mask 280 for the electrodeposited structures. A metal layer 281, which may be nickel, is deposited by electroplating on to the exposed regions 282 of metal layers 274 and 279 (FIG. 32E). The thickness of metal layer 281 is in the range of 0.5 μm to 10 μm; the layer 281 constitutes springs 285. The mask 280 and release layer 277 are removed by dissolving the layers in solvents or preferential etches. This process also removes sections of intermediate metal layers 283 (of metal layer 279) that are not reinforced by the electroplating (FIG. 32F).

The mirror support structure 284 is separated from the surrounding substrate 286 by etching both from the front, through the grooves 276 defined in the etch masks 272 and 273, and from the back by etching surface 275, resulting in the formation of cavity 288 surrounding the mirror support structure 284. The mirror support structure is thus joined to the substrate solely by the torsional springs 285. The final thickness of the mirror support structure 284 depends on the duration of the two etch steps.

When operated well below the torsion resonance frequency, the electrostatic force required for rotation of the mirrors to their design deflection angle may also result in unacceptably high bending deflection of the springs, pulling the springs into contact with the substrate below. Pretensioning the springs provides one way to increase the bending stiffness to prevent over-bending.

Another approach to prevent over-bending is to stiffen the springs against bending moments without affecting the torsional stiffness of the beam. For example, stiffening members may be added to the springs 56. During fabrication, one or more ribs 503 may be formed to protrude from the beam 505 of the spring 56 through the use of an additional sacrificial layer and step. See FIGS. 33 and 34. To form ribs with, high aspect ratios, several additional sacrificial layers may be used. Alternatively, the springs 56 may be formed with a stepped protrusion 507, which does not require additional deposition steps. See FIGS. 35 and 36. The ribs or protrusions may extend either upwardly away from the substrate or downwardly toward the substrate. Upwardly extending ribs or protrusions are preferred, because they are less likely to contact the substrate and electrically short to the actuation pads. The bending stiffness increases with ribs of greater aspect ratio, that is, ribs that are thin and tall.

In another approach, the actuation mechanism of the mirror is separated from the torsion springs supporting the mirror, which relaxes some of the constraints on the spring design, so that the bending stiffness can be more easily controlled separately from the torque. The torsion springs supporting the mirrors are narrow, and their length and cross section are chosen to give the resonant frequency required by the design specification. The torsion springs are offset from the substrate sufficiently to avoid any interference with the rotational motion, but this gap does not serve any other purpose and may be chosen to be any convenient value, as required by the fabrication sequence. The actuation mechanism is formed with pads placed some distance from the axis of rotation and separated from the silicon surface by a gap.

In one embodiment, illustrated in FIGS. 37 and 38, upper actuation pads 511 form bridges over the mirror 513, and lower pads (not visible in the figures) are deposited on the mirror surface. The mirror is supported by torsion springs 517. Because each bridge is supported at both ends on the substrate 519, the structure is mechanically quite stable. However, the length of the actuator is limited by the mirror size, and the bridge shadows the mirror, limiting the optically clear aperture.

In another embodiment, illustrated in FIGS. 39 and 40, upper actuation structures 521 are cantilevered from the mirror 523 over the substrate 525, and lower pads (not visible in the figures) are deposited on the substrate surface. The mirror is supported by torsion springs 529. In this embodiment, the mirror surface remains unobscured, and the actuator may be made as long as desired. The concern is that in the cantilevered design the actuator could potentially bend down and contact the substrate surface. The bending stiffness depends on the thickness of the electroplated layer. Thus, the thickness is selected so that the bending deflection is minimal.

Figure 41:
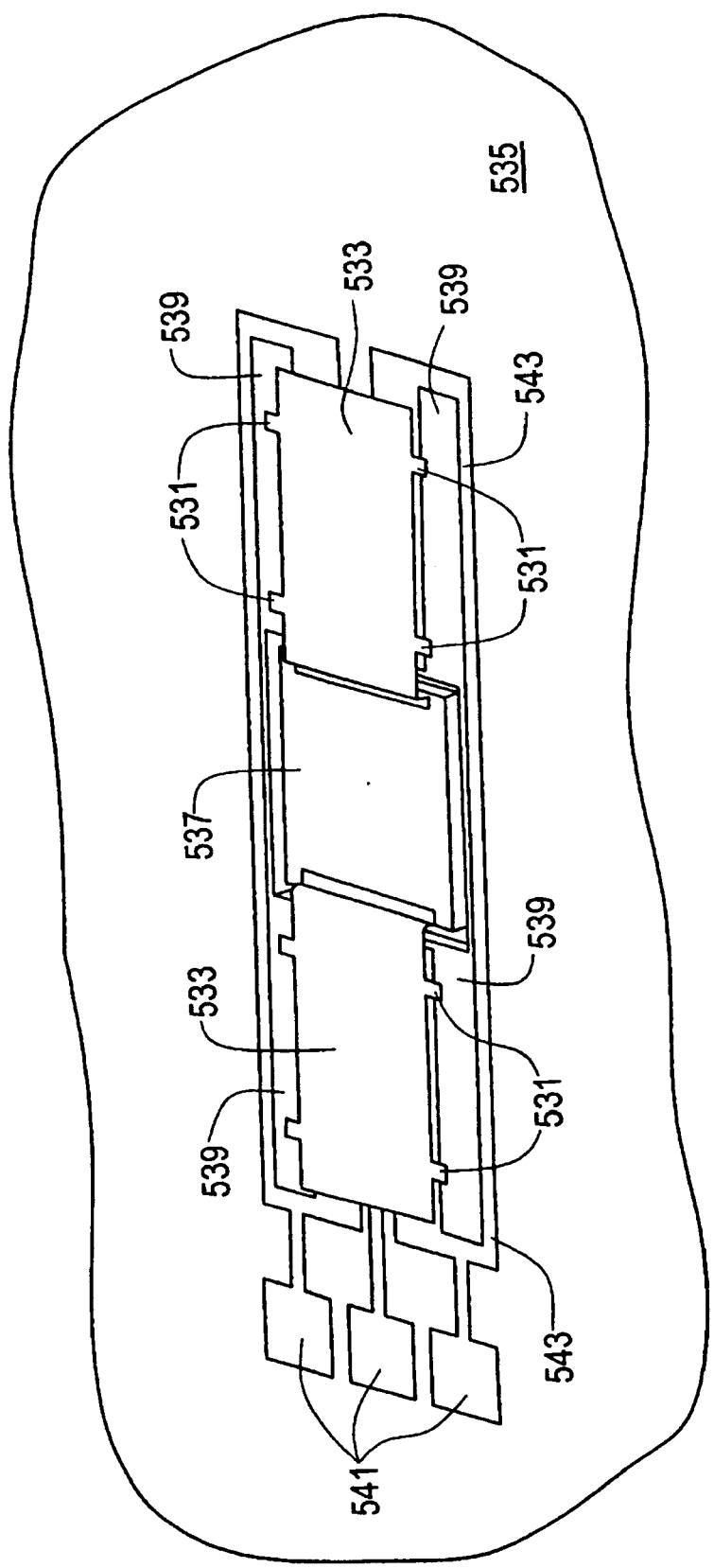
FIG. 41 is an isometric view of a further embodiment of a micromirror incorporating stops on the actuation mechanism to prevent overrotation.

Another concern is that the mirror may over-rotate. The force for a given voltage is inversely proportional to the square of the gap, so that as the gap closes, the force. increases dramatically. This can result in a snap-down phenomenon, in which, when the mirror is rotated beyond a certain angle, the increase in electrostatic force caused by the reduced capacitor gap, pulls the mirror to the maximum rotation. There is thus a maximum stable deflection angle that can be achieved by electrostatic actuation. To maximize angular movement, the mirror is designed for use to within 80% of that maximum angle. Therefore, to guard against the over-rotation failure mode, mechanical stops 531 are incorporated into the upper cantilevered actuators or wings 533. See FIG. 41. The stops are formed as protrusion from the long edges of the wings, parallel to the surface of the substrate 535 and extending perpendicular to the axis of rotation in a direction away from the axis. In this manner, when the mirror 537 rotates, the stops contact the substrate surface before the rest of actuation pad. The area 539 of the substrate that may be contacted by the stops 531 is kept clear of conduction paths or other elements that may be damaged by contact with the actuators. This prevents damage to the device that could be caused if the actuators 533 contacted the drive pads 541 or conduction paths 543 on the substrate.

Figure 42:
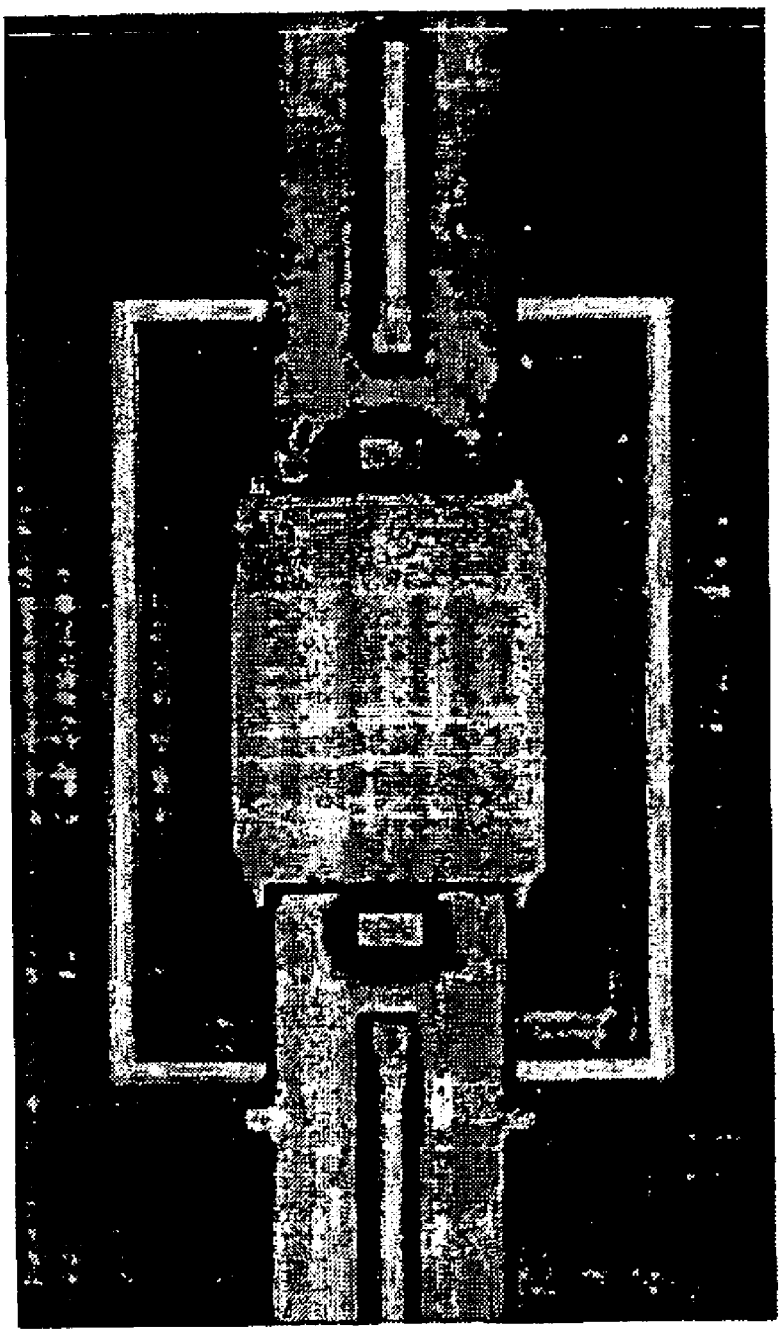
FIG. 42 is an optical microscope image of a micromirror fabricated according to the present invention.
Figure 43:
FIG. 43 is a scanning electron microscope image of, a portion of an array of mirrors.
Figure 44:
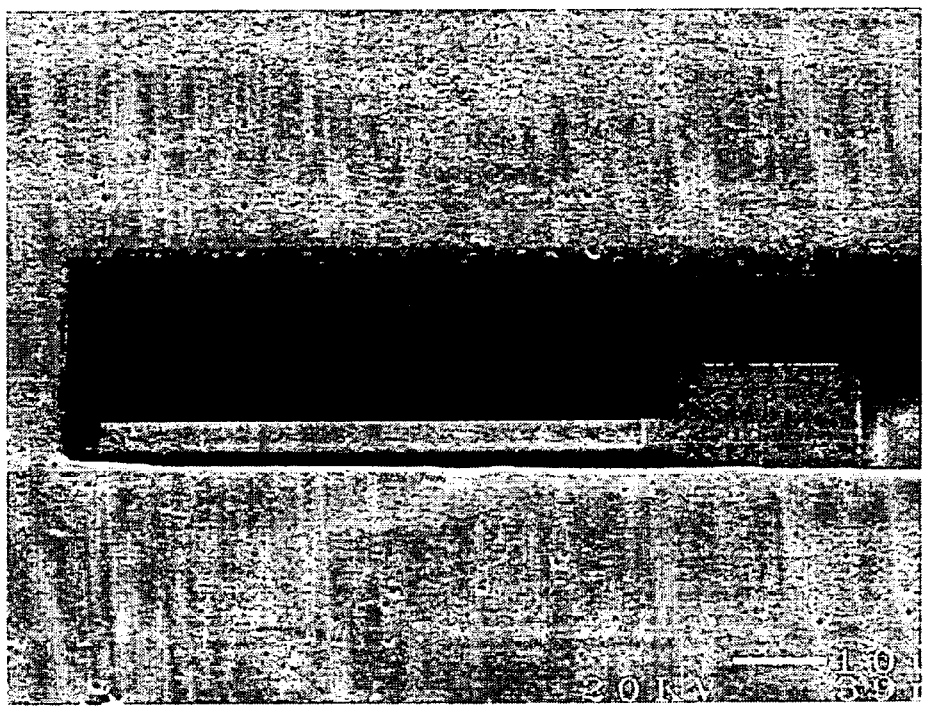
FIG. 44 is a scanning electron microscope image of a detail of a support structure of FIG. 43.

Mirror arrays incorporating mirrors designed with separate support springs and actuation structures have been fabricated. Images of the actuators are shown in FIGS. 42–44. FIG. 42 is an optical microscope image of a mirror showing a single mirror with cantilevered actuation structures and springs underneath the actuators (not visible). The actuators incorporate tabs to stop the rotation before the main part of the actuator contacts the substrate surface or the conduction paths on the surface. FIG. 43 shows a scanning electron microscope image of a portion of an array of mirrors. The image shows the actuators of three mirrors with the stop tabs along the long edge of each actuator as well as on the free ends. The actuation pads on the surface are visible underneath the actuation structures. FIG. 44 is a detail of the support structure of one of the mirrors, underneath the actuator.

A linear arrangement of mirrors, as described above, is practical for 8 input fibers or channels and can be scaled up to accommodate 12 or possibly 16 input fibers or channels. With an increasing number of channels, however, the linear mirror arrangement similarly becomes increasingly long, and the required mirror deflection angles become difficult to achieve for some of the input and output fiber pairs. If the path length could be increased sufficiently, the long array could be accommodated by increasing the system height, which has the effect of amplifying the angle.

Figure 45:
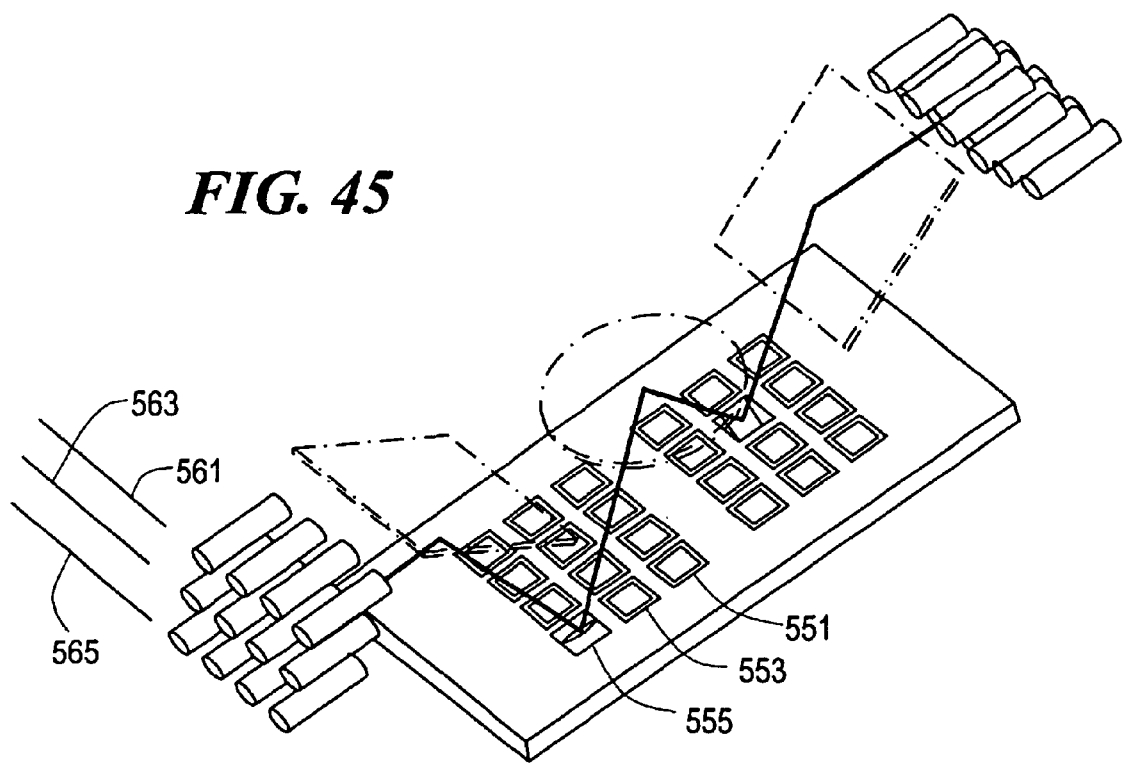
FIG. 45 is a schematic isometric view of an optical switch assembly incorporating a two-dimensional array of fibers and mirrors.
Figure 46:
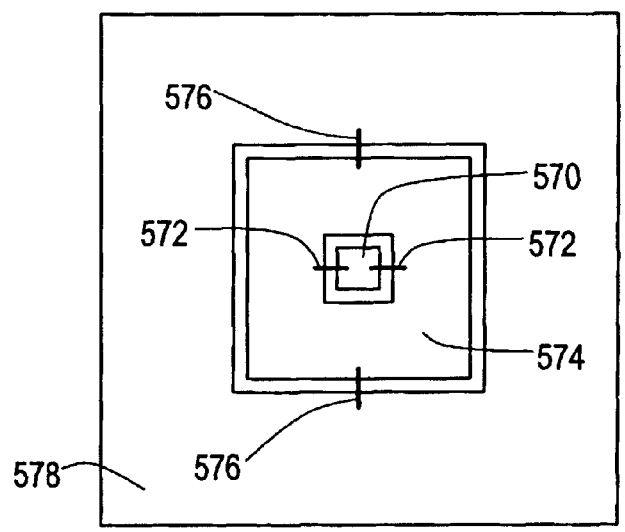
FIG. 46 is a partial plan view of a biaxial MEMS micromirror switching element for the optical switch assembly of FIG. 45.
Figure 47:
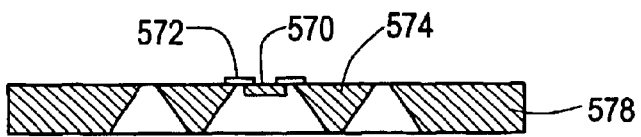
FIG. 47 is a cross-sectional view, of the biaxial MEMS micromirror switching element of FIG. 46.
Figure 48:
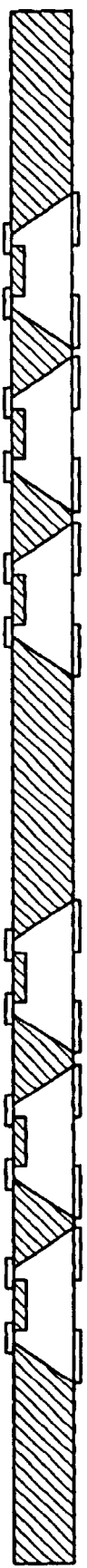
FIG. 48 is a schematic cross-sectional side view of a mirror array incorporating actuator structures on the back of a chip.

A further alternative, however, is to use a two-dimensional array of mirrors with each mirror mounted for biaxial rotation. See FIG. 45. For example, forty-eight channels can be accommodated using three rows 551, 553, 555 of sixteen mirrors in each row, corresponding to three rows 561, 563, 565 of sixteen fibers in each row. For clarity, only four mirrors and fibers are shown in each row in FIG. 45. Along the second axis, which is perpendicular to the fiber axis, the mirrors need only have three positions, one position corresponding to each row. The positions may be defined using mechanical stops to simplify the alignment and eliminate the need for position feedback along the second axis. A gimbaled support is provided to achieve the biaxial rotation. A biaxial micromirror configuration with a gimbaled support is illustrated in FIGS. 46 and 47. The mirror 570 is supported by a first set of torsion elements 572 for rotation in a frame 574 that is in turn supported from the substrate 578 by a second set of torsion elements 576 for rotation in the orthogonal direction.

Figure 51:
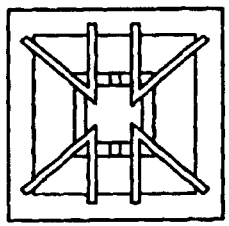
FIG. 51 is a bottom plan view of a still further embodiment of actuator structures on the back of a chip.
Figure 50:
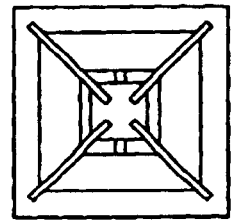
FIG. 50 is a bottom plan view of a further embodiment of actuator structures on the back of a chip.
Figure 49:
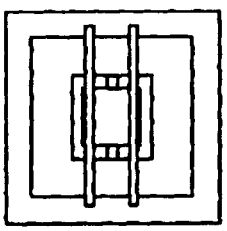
FIG. 49 is a bottom plan view of one embodiment of actuator structures on the back of a chip.

A gimbaled support increases the footprint of each mirror on the chip. Furthermore, additional actuators, conduction paths, and bond pads for the second direction also increase the area dedicated to each mirror. This increases the size of the chip, and therefore requires even greater optical paths. Thus, in a further alternative, at least some of the actuator structures and leads are moved off the chip surface, either to the back of the chip or onto another chip that can be bonded to the first chip. FIGS. 48–51 illustrate several geometries for actuators placed on the back of the chip. The actuators are anchored on the surface of the substrate surrounding the pit etched to thin the mirror and protrude under the mirror. One actuator design uses long actuators parallel to the axis of rotation of the mirror and anchored on either side of the pit beneath the mirror, as shown in FIG. 49. In an alternative design the actuators may be cantilevered from the substrate surface and extend under the mirror either from the sides or the corners of the pit, as shown in FIG. 50. A third design uses actuators anchored on two points on either side of each corner and extending underneath the corners, as shown in FIG. 51. The first design is suitable for a uni-axial mirror, while the second and third designs are suitable either for uni-axial or bi-axial mirrors.

Figure 52:
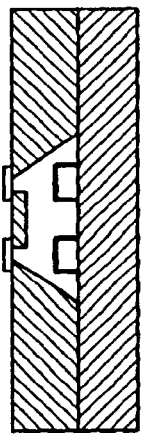
FIG. 52 is a schematic cross-sectional side view of a further embodiment incorporating actuator structures on a separate wafer.

In a further embodiment, the actuators may be fabricated on a separate wafer that is then attached to the mirror wafer. Such designs are known in the art; see for example, K. E. Peterson, "Silicon torsional scanning mirror," *IBM J. Res. Develop.*, 24 1980 pp. 631–637 and U. Breng et al., Electrostatic micromechanic actuators, *J. Micro-mechanics and Micro-engineering*, 2(4) 1992, pp. 256–261. Fabricating some of the electronics and/or mechanical structures on a different wafer allows greater flexibility in process development, optical design, and integration with electronic and photonic elements such as detector or control logic circuits. A particular advantage of the present invention is the use of three-dimensional micromachined structures on the bottom wafer to actuate the mirror similar to the actuators and supports described above, as shown in FIG. 52. This allows the distance between the mirror and the actuator to be controlled independently of the thickness of the substrate on which the mirrors are fabricated.

In order to use micromachined grooves for the positioning of fibers and lenses, the individual fibers must be prepared with flat, normal faces and carefully fixed in their position. Handling large numbers of fibers individually is inefficient and results in high costs and low yields. Accordingly, in a further embodiment, terminated fiber bundles may be used. Methods of handling multiple fibers using V-groove arrays are known in the art. See for example U.S. Pat. Nos. 5,257,334 and 5,321,785. The fibers are placed in the V-grooves of the bottom substrate, which may be made of silicon. A grooved cover is then adhered to the top of the fibers and the bottom substrate using an appropriate adhesive. The grooved substrates may be used in, pairs or the top substrate may be grooved on both sides to allow the substrates to be stacked to form two-dimensional fiber arrays.

Typically, the fiber ends are polished by polishing the face of the substrate stack after assembly. This avoids the need to individually prepare the fiber ends. The fibers are held in predetermined positions by the grooved substrates and the faces are aligned on a plane by the polishing process. Optionally, the face of the array may be polished at an angle other than 90° to the optical axis. Polishing this face at an angle other than 90° results in the bending of the optical path due to refraction at the interface, which may be advantageous in the optical design. Packaging of fibers using this method is available commercially, for example from Sumitomo Electric or Senko Advanced Components.

The fiber array may then be aligned with an array of lenses. Micromachined alignment features may be used to control the spacing and alignment between the fiber faces and the lenses. Alignment features as described above may be used. The axes of the fibers may be parallel or perpendicular to the silicon wafer surface, or the fibers may approach the surface at another preselected angle.

Figure 53:
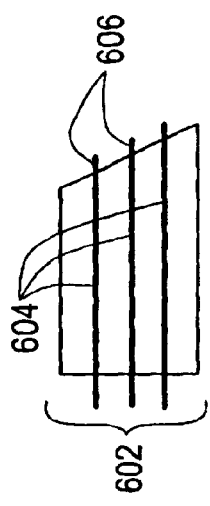
FIG. 53 illustrates a'substrate stack of a fiber array.

The stacked substrate method of aligning fibers results in fiber ends that are coplanar with the polished edges of the substrate. In order to align the fiber array to the rest of the optical system using mechanical features, it may be desirable to have the fiber ends protrude from the substrate by a controlled amount. This may be achieved, for example, by etching the prepared fiber/substrate assembly using a process that etches silicon and not glass. An example of such a process is plasma etching using SF6. This may be used on a fiber stack with the polished face perpendicular to the fiber axis or the polished face at an angle to the fiber axis. FIG. 53 shows a fiber array 602 polished at an angle to the axis of the fibers 604 and etched back so that the fiber ends 606 protrude. The exposed fiber ends may be placed in grooves or holes to align them with lenses, mirrors, or other optical elements.

Optionally, the fiber array may be attached from the back of the wafer, with either the fibers or the free space light path passing through through-holes in the chip. The fibers and lenses may be held in place by a combination of bulk micromachined grooves, pits, and through-holes, and surface micromachined levers and springs. Micromachined positioning and retaining elements are known in the art; see D. F. Moore and R. R. A. Syms, *Recent developments in micromachined silicon*, Electronics and Communication Engineering Journal, December 1999, pp. 261–270. The optical components used to focus and direct the beam may be lenses or mirrors and may be attached to the package or the silicon wafer surface, offset from it, or placed below the wafer surface in pits or through-holes.

Figure 54:
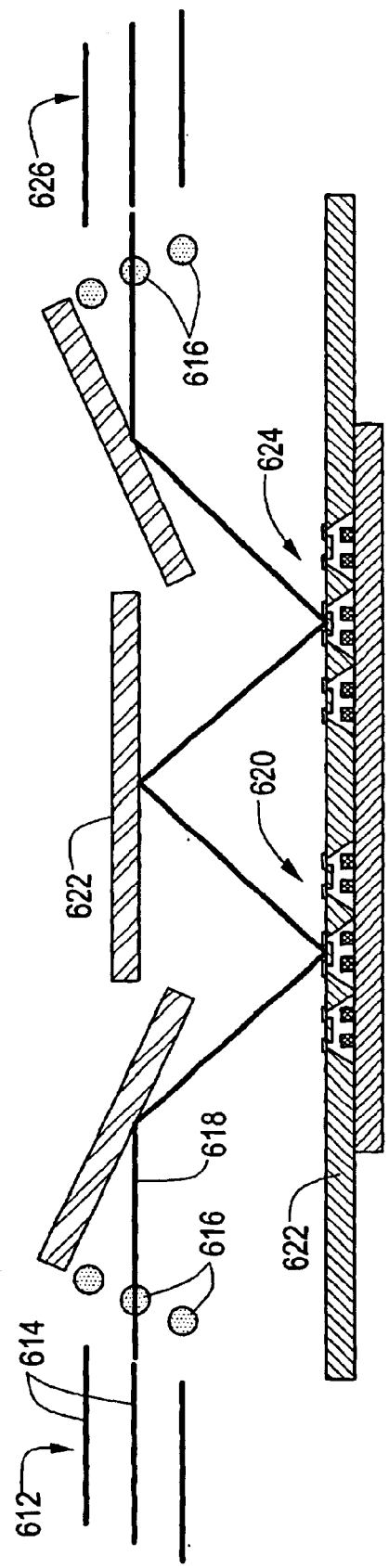
FIG. 54 illustrates an embodiment of a two-dimensional optical switch assembly.

FIG. 54 shows a general sketch of the geometry of a switch incorporating two-dimensional fiber arrays 612. Input and output fibers are arranged in two-dimensional arrays. The fiber ends may be coplanar or may be staggered as shown in FIG. 54. Each fiber 614 is associated with a focusing or collimating element 616, which may be a mirror, lens, or diffractive element, positioned at an appropriate distance from the face of the fiber. The path 618 of the beam is then directed toward a MEMS mirror array 620 fabricated on a substrate 622. This may be accomplished using a separate fixed mirror as shown in FIG. 54 or incorporated into the optical design of the focusing/collimating elements. The fiber face position may be staggered and the MEMS mirror array spacing may be chosen in such a manner that the path from the fiber face to the MEMS mirror is the same length for all the input or output fibers. The MEMS mirrors associated with the input fibers redirect the light, toward an upper fixed mirror 622 that then redirects the light towards the output MEMS mirrors 624 and output fiber array 626 in a manner analogous to that described above, except that the mirrors rotate in two dimensions to select the fiber position within the two-dimensional array.

Figure 55:
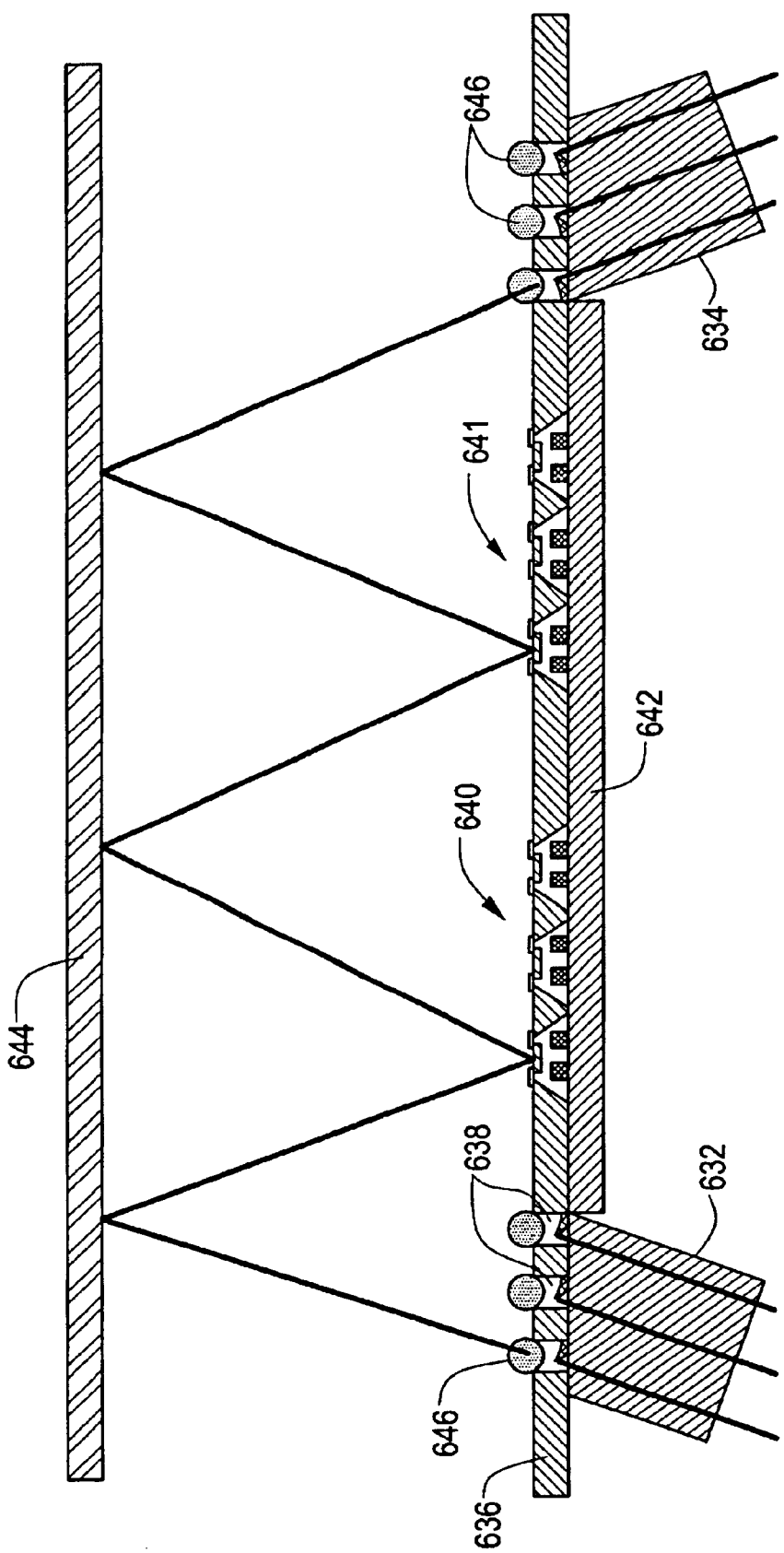
FIG. 55 illustrates a further embodiment of a two-dimensional optical switch assembly.

FIG. 55 shows a specific embodiment of an optical design using two-dimensional stacked and polished fiber arrays that have been etched back to expose, the fiber ends. The elements include two fiber arrays 632, 634 in substrate stacks, a first substrate 636 containing through-holes 638 to accept the fiber tips and MEMS steering mirror arrays 640, 641 associated with each fiber array, optionally a second substrate 642 underneath the first substrate containing electronic or mechanical elements, and a fixed mirror 644 parallel to the first substrate positioned above the substrate surface at a distance chosen for efficient transmission of light signals. The two-dimensional fiber arrays are contained within stacks of grooved substrates that have been terminated and polished at an angle. The structures are then etched away exposing the fiber tips. The fiber, tips are inserted in the through-holes in the substrate. Positioning elements may be included to position and retain the fiber tips in the through-holes if desired. Lenses 646 are placed on the surface of the substrate opposite to the grooved substrates holding the fibers. The distance between the face of the fibers and the lens is determined by the thickness of the substrate, the diameter of the holes, and the length of exposed fiber beyond the face of the grooved substrate stack holding the fibers.

The light beam diverges as it exits the fiber and is focused by the lens and propagates along an angle determined by the angle of the fiber axis relative to the substrate holding the lens and the angle of the fiber face relative to the fiber axis. The fixed mirror parallel to the substrate is placed between the lens to reflect the beam back onto the MEMS steering mirrors. The light reflects back to the fixed mirror and then back to the second MEMS mirror array associated with the output fiber, back to the fixed mirror, and back to the lens associated with the output fiber. The MEMS steering mirrors rotate in two dimensions to select pairs of input and output fibers in a manner analogous to the manner described above.

As noted above, when the system is scaled up to a large number of channels, the size of the package and therefore the optical path lengths increase. For a Gaussian beam, the maximum distance between the focusing optic and the beam waist is limited, depending on the power of the optic; the wavelength, and the beam radius. One way of achieving long path lengths is to decrease the power of the focusing optic by increasing its radius of curvature. However, this increases the size of the beam at the mirrors, and therefore the size of the optical system.

A more preferred approach is to package the system in an optical fluid, as noted above. In a higher index material, the beam divergence is smaller so that element sizes are smaller and the paths are longer. Also, the reduction in index of refraction contrast between the lens material and the medium reduces the power of the lens, which allows higher curvatures. This may, for example, allow for the use of standard ball lenses rather then custom optics. The fluid may have non-optical advantages as well, including mechanical damping to reduce vibration and overshoot in the motion, amplification of the electrostatic forces resulting from high dielectric constant, and thermal management advantages.

Figure 56:
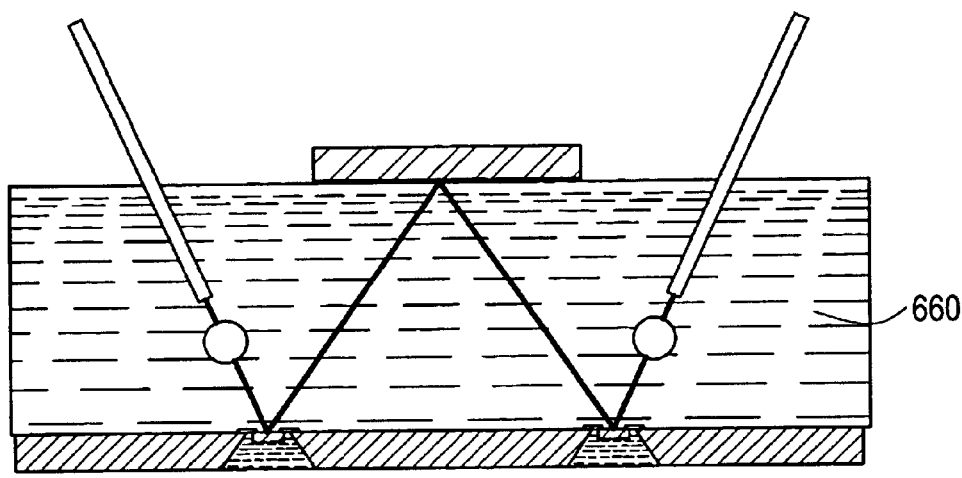
FIG. 56 illustrates a fluid-filled optical switch assembly.

Consider, for example, how the optical design described above changes for a 1.5 $\mu$m wavelength signal and smaller lenses to facilitate fabrication and packaging. For 0.5 mm BK7 glass ball lenses, the focal length in air is 0.37 mm. In air, the maximum distance between the lens and the intermediate beam waist is 1.75 mm, which requires the gap between the fiber and the lens to be 0.16 mm. These lengths are quite small compared with the lens size. The situation is improved by submerging the system in an optically clear fluid 660, as shown in FIG. 56. An example of such a fluid is FC-43, a fluorinated solvent made by 3M that is useful for optical applications. FC-43 is chemically inert, its index of refraction is 1.29 and its dielectric constant is 1.8. The reduced contrast between BK7 and the surrounding medium increases the effective focal length to 0.68 mm and reduces the divergence of the beam, further increasing the optical path lengths. The resulting distance to the intermediate beam waist is 7.1 mm with a gap of 0.64 mm. The beam diameter at the lens is 140 $\mu$m, and at the beam waist it is 110 $\mu$m. The system requires switching mirrors of approximately 300 $\mu$m to capture the entire beam and minimize cross talk between mirrors. Since the dielectric constant of FC-43 is 1.8, the required actuation voltages are also reduced by almost 35%. A higher dielectric constant would offer greater advantage; water, for example, has a dielectric constant of 100, for a factor of 10 reduction in the voltage. Water is not suitable because of its chemistry, but the system may be further optimized by identifying a suitable medium with higher dielectric constant and selecting a lens material with lower optical contrast to reduce the size of the optical elements for a given optical power.

Figure 57:
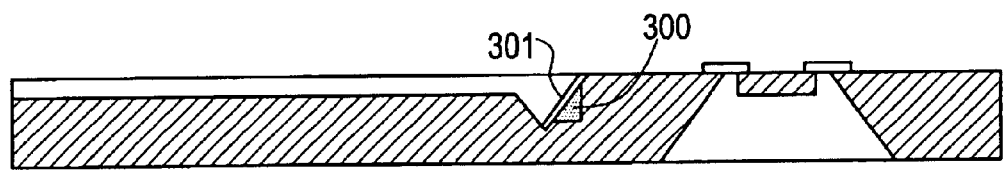
FIG. 57 is a partial cross-sectional side view of an optical switch assembly incorporating an optical detector.
Figure 58:
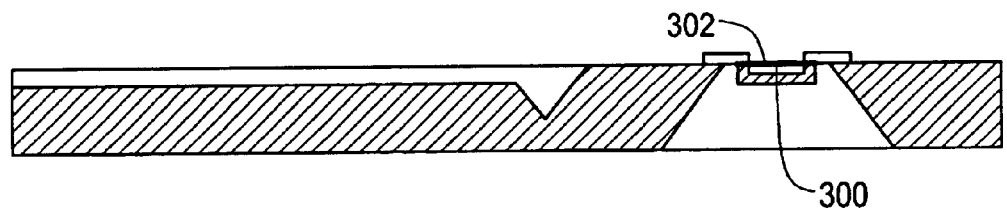
FIG. 58 is a partial cross-sectional side view of a further embodiment incorporating an optical detector.
Figure 59:
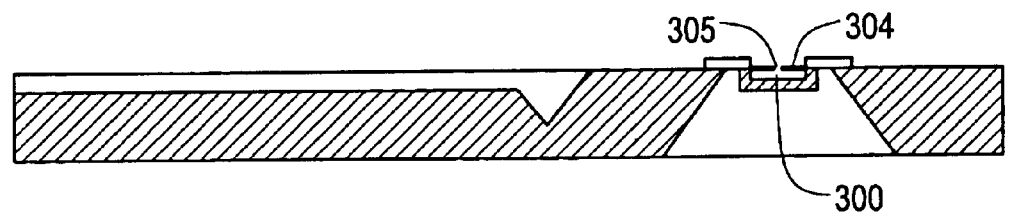
FIG. 59 is a partial cross-sectional side view of a still further embodiment incorporating an optical detector.

Optionally, optical detectors may be incorporated into the semiconductor chip. These detectors may serve to determine and control the position of the switching mirrors, or to read the data stream and interface with the electronic logic circuit that control the switch. FIGS. 57–59 illustrate several options for detector placement. A detector 300 may be placed behind one or more of the mirror surfaces on the semiconductor chip, including a turning mirror 301 near the input fiber end (FIG. 57), the output fiber end (not shown), or under the torsion MEMS mirror 302 (FIG. 58). The mirror coating may be made partially transparent to allow a portion of the beam to reach the sensor. Normally, reflective coatings are optimized to reflect as much of the beam as possible, with reflectivity exceeding 95%, but this value can be tailored to allow some of the light to reach the sensor. Alternatively, a highly reflective coating 304 may be used on the torsion mirror with a gap 305 formed in the coating over the detector 300 (FIG. 59). The detector may be fabricated by doping the semiconductor substrate using established semiconductor device designs. These approaches increase the insertion loss of the switch. The signal must be decoded and the logic must be processed somewhere in the system, however, and placing these functions on the same chip as the switching element can result in improved overall efficiency and also results in smaller overall system volume, and reduced power consumption.

The invention is not to be limited by what has been particularly shown and described, except as indicated by the appended claims.

What is claimed is:

1. A micro-electromechanical optical switch assembly comprising:
    a substrate and a cover disposed over an upper surface of the substrate;
    an array of input optical fibers and an array of output optical fibers supported by the substrate;
    an array of input reflective switching elements, each one of the input switching elements disposed to receive light transmitted from an associated input optical fiber, each of the input switching elements rotatably supported by the substrate for rotation about an axis parallel with an end portion of the associated input optical fiber;
    an array of output reflective switching elements, each one of the output switching elements disposed to transmit light to an associated output optical fiber, each of the output switching elements rotatably supported by the substrate for rotation about an axis parallel with an end portion of the associated output optical fiber;
    an intermediate reflective element supported by the cover on an optical path between the input switching elements and the output switching elements and disposed to direct light received from the input switching elements to the output switching elements; and
    an actuating mechanism operative to control rotation of the input switching elements and the output switching elements.

2. The micro-electromechanical optical switch assembly of claim 1, wherein the actuating mechanism is operative to rotate a selected one of the input switching elements to a position to direct light to a selected one of the output switching elements, and to rotate a selected one of the output switching elements to a position to direct light to a selected one of the output optical fibers.

3. The micro-electromechanical optical switch assembly of claim 1, wherein each of the input switching elements and each of the output switching elements are supported by torsional springs aligned for torsional rotation along the rotation, axis.

4. The micro-electromechanical optical switch assembly of claim 3, wherein the torsional springs include stiffening members configured to minimize bending deflection.

5. The micro-electromechanical optical switch assembly of claim 4, wherein the stiffening members comprise at least one rib formed to extend from a beam of the torsional springs.

6. The micro-electromechanical optical switch assembly of claim 4, wherein the stiffening members comprise a stepped protrusion formed in the torsional springs.

7. The micro-electromechanical optical switch assembly of claim 3, wherein the actuating mechanism further comprises actuation pads on the torsional springs and cooperative with further actuation pad on the substrate.

8. The micro-electromechanical optical switch assembly of claim 3, wherein the actuating mechanism further comprises actuation pads on a bridge extending over each of the switching elements and cooperative with further actuation pads on the substrate.

9. The micro-electromechanical optical switch assembly of claim 3, wherein the actuating mechanism further comprises actuation pads on cantilever members extending from each of the switching elements over the substrate and cooperative with further actuation pads on the substrate.

10. The micro-electromechanical optical switch assembly of claim 9, wherein the cantilever members include stop tabs extending therefrom configured to contact the substrate upon sufficient rotation of the switching element.

11. The micro-electromechanical optical switch assembly of claim 1, wherein the input switching elements and the output switching elements are integrally formed in the substrate.

12. The micro-electromechanical optical switch assembly of claim 11, wherein the substrate comprises a semiconductor wafer.

13. The micro-electromechanical optical switch assembly of claim 1, wherein the input switching elements and the output switching elements are sized to minimize loss of light from the input optical fibers to the output optical fibers.

14. The micro-electromechanical optical switch assembly of claim 1, wherein the array of input optical fibers and the array of input switching elements, and the array of output optical fibers and the array of output switching elements are each linear.

15. The micro-electromechanical optical switch assembly of claim 1, wherein the array of input optical fibers and the array of input switching elements, and the array of output optical fibers and the array of output switching elements are each two-dimensional.

16. The micro-electromechanical optical switch assembly of claim 15, wherein each of the input switching elements and each of the output switching elements are supported by further torsional springs aligned for torsional rotation along a further axis orthogonal to the rotation axis.

17. The micro-electromechanical optical switch assembly of claim 1, wherein each of the input switching elements and each of the output switching elements are supported by further torsional springs aligned for torsional rotation along a further axis orthogonal to the rotation axis.

18. The micro-electromechanical optical switch assembly of claim 1, wherein the intermediate reflective element is fixed to the cover.

19. The micro-electromechanical optical switch assembly of claim 1, wherein the intermediate reflective element comprises a mirror.

20. The micro-electromechanical optical switch assembly of claim 1, wherein the intermediate reflective element comprises an elongated reflective member disposed to extend a length of the array of input optical fibers and the array of output optical fibers.

21. The micro-electromechanical optical switch assembly of claim 1, wherein the intermediate reflective element comprises a plurality of reflective members associated with each of the input switching elements.

22. The micro-electromechanical optical switch assembly of claim 1, wherein the input optical fibers and the output optical fibers are each supported in grooves formed in the substrate.

23. The micro-electromechanical optical switch assembly of claim 22, further comprising further grooves formed in the cover corresponding to the grooves formed in the substrate.

24. The micro-electromechdnical optical switch assembly of claim 1, further comprising an alignment device disposed to cooperatively align the substrate and the cover.

25. The micro-electromechanical optical switch assembly of claim 24, wherein the alignment device comprises a protrusion on one of the cover and the substrate and a corresponding depression on the other of the cover and the substrate.

26. The micro-electromechanical optical switch assembly of claim 24, wherein the alignment device comprises corresponding depressions formed in the cover and the substrate and a free element disposed within the corresponding depressions.

27. The micro-electromechanical optical switch assembly of claim 24, further comprising:
   a bottom cover; and
   the alignment device comprises a hole through the substrate, and a corresponding depression in one of the cover and the bottom cover, and a protrusion on the other of the cover and the bottom cover disposed to extend through the hole and into the corresponding depression.

28. The micro-electromechanical optical switch assembly of claim 1, further comprising a collimating optical component disposed adjacent an end of each of the input optical fibers.

29. The micro-electromechanical optical switch assembly of claim 28, wherein the collimating optical component comprises a ball lens or a gradient index lens.

30. The micro-electromechanical optical switch assembly of claim 1, further comprising:
   an input lower optical turning element and an input upper optical turning element;
   the input lower optical turning element disposed to reflect light from the input optical fiber to the input upper optical turning element; and
   the input upper optical turning element disposed to reflect light to a selected one of the input switching elements.

31. The micro-electromechanical optical switch assembly of claim 30, wherein the input lower optical turning element is supported by the substrate; and
   the input upper optical turning element is supported by the cover.

32. The micro-electromechanical optical switch assembly of claim 30, wherein the input lower optical turning element is fixedly supported by the substrate.

33. The micro-electromecnanical optical switch assembly of claim 30, wherein the input lower optical turning element is supported in a groove formed in the substrate.

34. The micro-electromechanical optical switch assembly of claim 30, wherein the input lower optical turning element comprises an elongated mirror.

35. The micro-electromechanical optical switch assembly of claim 30, wherein the input lower optical turning element comprises a plurality of mirrors.

36. The micro-electromechanical optical switch assembly of claim 30, wherein the input lower optical turning element comprises a reflective coating on a surface of the substrate.

37. The micro-electromechanical optical switch assembly of claim 30, wherein the input lower optical turning element comprises a mirror attached to a surface of the substrate.

38. The micro-electromechanical optical switch assembly of claim 37, wherein the mirror is wedge-shaped.

39. The micro-electromechanical optical switch assembly of claim 30, wherein the cover is optically transparent and includes a protrusion extending into a groove formed in the substrate, and the input lower optical turning element is supported on the protrusion.

40. The micro-electromechanical optical switch assembly of claim 39, wherein the input lower optical turning element comprises a reflective coating formed on a surface of the protrusion.

41. The micro-electromechanical optical switch assembly of claim 39, wherein the input lower optical turning element comprises an internal reflective surface formed on the protrusion.

42. The micro-electromechanical optical switch assembly of claim 30, wherein the input lower optical turning element comprises a collimating optical element.

43. The micro-electromechanical optical switch assembly of claim 42, wherein the collimating optical element comprises a curved mirror.

44. The micro-electromechanical optical switch assembly of claim 30, wherein the input upper optical turning element comprises a mirror embedded in the cover.

45. The micro-electromechanical optical switch assembly of claim 44, wherein the mirror is shaped to collimate light from a selected one of the input optical fibers.

46. The micro-electromechanical optical switch assembly of claim 30, wherein the upper optical turning element comprises a mirror and a lens, the lens configured to collimate light transmitted from a selected one of the input optical fibers.

47. The micro-electromechanical optical switch assembly of claim 30, wherein the input upper optical turning element is operative to collimate light transmitted from a selected one of the input optical fibers.

48. The micro-electromechanical optical switch assembly of claim 30, wherein the input upper optical turning element is fixedly supported on the cover.

49. The micro-electromechanical optical switch assembly of claim 30, wherein the input upper optical turning element comprises a mirror.

50. The micro-electromechanical optical switch assembly of claim 49, wherein the mirror is shaped to collimate light from a selected input optical fiber.

51. The micro-electromechanical optical switch assembly of claim 30, wherein the input upper optical turning element comprises a plurality of mirrors, each mirror associated with a selected input optical fiber.

52. The micro-electromechanical optical switch assembly of claim 51, wherein each mirror is shaped to collimate light from the input optical fiber.

53. The micro-electromechanical optical switch assembly of claim 1, further comprising:
   an output lower optical turning element and an output upper optical turning element;

the output upper optical turning element disposed to reflect light from a selected one of the output switching elements to the output lower optical turning element; and the output lower optical turning element disposed to reflect light to a selected one of the output optical fibers.

54. The micro-electromechanical optical switch assembly of claim 53, wherein the output upper optical turning element is operative to focus light from the selected one of the output switching elements.

55. The micro-electromechanical optical switch assembly of claim 53, wherein the output lower optical turning element is supported by the substrate, and the output upper optical turning element is supported by the cover.

56. The micro-electromechanical optical switch assembly of claim 53, wherein the output lower optical turning element is fixedly supported on the substrate.

57. The micro-electromechanical optical switch assembly of claim 53, wherein the output lower optical turning element comprises an elongated mirror.

58. The micro-electromechanical optical switch assembly of claim 53, wherein the output lower optical turning element comprises a plurality of mirrors.

59. The micro-electromechanical optical switch assembly of claim 53, wherein the output lower optical turning element comprises a reflective coating on a surface of the substrate.

60. The micro-electromechanical optical switch assembly of claim 53, wherein the output lower optical turning element comprises a mirror attached to a surface of the substrate.

61. The micro-electromechanical optical switch assembly of claim 60, wherein the mirror is wedge-shaped.

62. The micro-electromechanical optical switch assembly of claim 53, wherein the cover is optically transparent and includes a protrusion extending into a groove formed in the substrate, and the output lower optical turning element is supported on the protrusion.

63. The micro-electromechanical optical switch assembly of claim 62, wherein the output lower optical turning element comprises a reflective coating formed on a surface of the protrusion.

64. The micro-electromechanical optical switch assembly of claim 62, wherein the output lower optical turning element comprises an internal reflective surface formed on the is protrusion.

65. The micro-electromechanical optical switch assembly of claim 53, wherein the output lower optical turning element comprises a focusing optical element.

66. The micro-electromechanical optical switch assembly of claim 65, wherein the focusing optical element comprises a curved mirror.

67. The micro-electromechanical optical switch assembly of claim 53, wherein the output upper optical turning element comprises a mirror embedded in the cover.

68. The micro-electromechanical optical switch assembly of claim 67, wherein the mirror is shaped to focus light to a selected one of the output optical fibers.

69. The micro-electromechanical optical switch assembly of claim 53, wherein the upper optical turning element comprises a mirror and a lens, the lens configured to focus light to a selected one of the output optical fibers.

70. The micro-electromechanical optical switch assembly of claim 53, wherein the output upper optical turning element is operative to focus light to a selected one of the output optical fibers.

71. The micro-electromechanical optical switch assembly of claim 53, wherein the output upper optical turning element is fixedly supported on the cover.

72. The micro-electromechanical optical switch assembly of claim 53, wherein the output upper optical turning element comprises a mirror.

73. The micro-electromechanical optical switch assembly of claim 72, wherein the mirror is shaped to focus light from the output switching element.

74. The micro-electromechanical optical switch assembly of claim 53, wherein the output upper optical turning element comprises a plurality of mirrors, each mirror associated with a selected output optical fiber.

75. The micro-electromechanical optical switch assembly of claim 74, wherein each mirror is shaped to focus light from the output switching element.

76. The micro-electromechanical optical switch assembly of claim 1, wherein the array of input optical fibers and the array of output optical fibers are aligned in grooves formed in the substrate.

77. The micro-electromechanical optical switch assembly of claim 76, wherein the cover includes a plurality of grooves formed therein in alignment with the grooves formed in the substrate.

78. The micro-electromechanical optical switch assembly of claim 1, wherein the cover is formed of an optically transparent material.

79. The micro-electromechanical optical switch assembly of claim 1, further comprising a bottom cover fixed to a lower surface of the substrate.

80. The micro-electromechanical optical switch assembly of claim 1, wherein a sealed cavity is provided in the substrate surrounding the optical switching elements.

81. The micro-electromechanical optical switch assembly of claim 80, further comprising:

a bottom cover disposed over a lower surface of the substrate; and the sealed cavity is defined between the cover and bottom cover.

82. The micro-electromechanical optical switch assembly of claim 80, wherein the sealed cavity is filled with air, an inert gas, or a vacuum.

83. The micro-electromechanical optical switch assembly of claim 80, wherein the sealed cavity is filled with an optically transparent, non-electrically conductive dielectric liquid.

84. The micro-electromechanical optical switch assembly of claim 83, wherein the liquid comprises an oil or glycerin.

85. The micro-electromechanical optical switch assembly of claim 80, wherein the sealed cavity is filled with a liquid selected to provide damping of the switching elements.

86. The micro-electromechanical optical switch assembly of claim 80, wherein the sealed cavity is filled with a liquid selected to provide shock resistance.

87. The micro-electromechanical optical switch assembly of claim 80, wherein the sealed cavity is filled with a liquid having a dielectric constant selected to amplify electrostatic force acting on the switching elements.

88. The micro-electromechanical optical switch assembly of claim 80, wherein the sealed cavity is filled with a liquid having an index of refraction selected to reduce optical divergence of light transmitted through the sealed cavity.

89. The micro-electromechanical optical, switch assembly of claim 80, wherein the sealed cavity is filled with a fluorinated solvent.

90. The micro-electromechanical optical switch assembly of claim 1, further comprising an optical detector element disposed on an optical path and in communication with the actuating mechanism.

91. The micro-electromechanical optical switch assembly of claim 90, wherein the optical detector element is disposed behind the input switching element.

92. The micro-electromechanical optical switch assembly of claim 90, wherein the optical detector element is disposed at an end of the input optical fibers.

93. The micro-electromechanical optical switch assembly of claim 90, further comprising:

an input optical turning element disposed to reflect light from the input optical fiber to the input turning element; and the optical detector element is disposed behind the input optical turning element.

94. The micro-electromechanical optical switch assembly of claim 93, wherein the input optical turning element is supported by the substrate.

95. The micro-electromechanical optical switch assembly of claim 93, wherein the input optical turning element is supported by the cover.

96. The micro-electromechanical optical switch assembly of claim 90, further comprising:

an output optical turning element disposed to transmit light from to the output switching element to the output optical fiber; and the optical detector element is disposed behind the output optical turning element.

97. The micro-electromechanical optical switch assembly of claim 96, wherein the output optical turning element is supported by the substrate.

98. The micro-electromechanical optical switch assembly of claim 96, wherein the output optical turning element is supported by the cover.

99. The micro-electromechanical optical switch assembly of claims 1, 16, or 17, wherein the actuating mechanism comprises first actuation pads on a bottom of each of the input and output reflective switching elements and second actuation pads supported on a bottom surface of the substrate in opposition to the first actuation pads.

100. The micro-electromechanical optical switch assembly of claim 99, wherein the second actuation pads extend parallel to the respective rotation axis of an associated one of the input and output reflective switching elements.

101. The micro-electromechanical optical switch assembly of claim 99, wherein the second actuation pads are cantilevered from the bottom surface of the substrate.

102. The micro-electromechanical optical switch assembly of claims 16 or 17, wherein:

the actuating mechanism comprises first actuation pads on a bottom of each of the input and output reflective switching elements and second actuation pads supported on a bottom surface of the substrate in opposition to the first actuation pads; and the second actuation pads extend at angle intermediate the rotation axis and the further rotation axis of an associated one of the input and output reflective switching elements.

103. The micro-electromechanical optical switch assembly of claims 16 or 17, wherein:

the actuating mechanism comprises first actuation pads on a bottom of each of the input and output reflective switching elements and second actuation pads supported on a bottom surface of the substrate i n opposition to the first actuation pads; and the second actuation pads include pads extending parallel to the rotation axis and to the further rotation axis of an associated one of the input and output reflective switching elements.

104. The micro-electromechanical optical switch assembly of claims 1, 16, or 17, wherein the actuating mechanism comprises first actuation pads on a bottom of each of the input and output reflective switching elements and second actuation pads disposed in opposition to the first actuation pads and supported on a second substrate bonded to a lower surface of the substrate.

105. The micro-electromechanical optical switch assembly of claim 15, wherein the input fibers and the output fibers are supported in a substrate stack comprising a plurality of substrate layers.

106. The micro-electromechanical optical switch assembly of claim 105, wherein end faces of the input fibers and the output fibers protrude beyond an end face of the substrate stack.

107. The micro-electromechanical optical switch assembly of claim 105, wherein the substrate stack is mounted to a bottom surface of the substrate and the end faces of the input fibers and the output fibers extend into through-holes formed in the substrate.

108. The micro-electromechanical optical switch assembly of claim 1, further including a, bottom cover, a chamber defined between the cover and the bottom cover.

109. The micro-electromechanical optical switch assembly of claim 108, wherein a cavity is defined between the cover and the bottom cover, and an optically clear fluid is disposed within the cavity.

110. The micro-electromechanical optical switch assembly of claim 109, wherein the fluid comprises a fluorinated solvent.

* * * * *

UNITED STATES PATENT AND TRADEMARK OFFICE
CERTIFICATE OF CORRECTION

PATENT NO. : 6,701,038 B2
DATED : March 2, 2004
INVENTOR(S) : Noa M. Rensing et al.

It is certified that error appears in the above-identified patent and that said Letters Patent is hereby corrected as shown below:

Column 21,
Line 48, "is protrusion" should read -- protrusion --; and

Column 24,
Line 13, "i n" should read -- in --.

Signed and Sealed this

Twenty-first day of December, 2004

JON W. DUDAS
*Director of the United States Patent and Trademark Office*